US012674944B2

(12) United States Patent
Shao et al.

(10) Patent No.: US 12,674,944 B2
(45) Date of Patent: Jul. 7, 2026

(54) PHOTONIC DEVICE AND METHOD OF MANUFACTURE

(71) Applicant: Taiwan Semiconductor Manufacturing Co., Ltd., Hsinchu (TW)

(72) Inventors: Tung-Liang Shao, Hsinchu (TW); Hsing-Kuo Hsia, Jhubei City (TW); Chen-Hua Yu, Hsinchu (TW); Chih-Ming Ke, Hsinchu (TW); Chih-Wei Tseng, Hsinchu (TW); You-Rong Shaw, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 475 days.

(21) Appl. No.: 18/190,223

(22) Filed: Mar. 27, 2023

(65) Prior Publication Data

US 2024/0329336 A1 Oct. 3, 2024

(51) Int. Cl.
*G02B 6/42* (2006.01)

(52) U.S. Cl.
CPC .................................. *G02B 6/4214* (2013.01)

(58) Field of Classification Search
CPC .......... G02B 6/4214; G02B 6/26; G02B 6/43
See application file for complete search history.

(56) References Cited

U.S. PATENT DOCUMENTS

2017/0315316 A1* 11/2017 Tanaka ................... H05K 3/188
2018/0239096 A1 8/2018 Houbertz et al.

2022/0107456 A1 4/2022 Kalman et al.
2022/0155539 A1* 5/2022 Pietambaram ....... G02B 6/4214
2022/0334310 A1 10/2022 Yu et al.
2022/0390693 A1 12/2022 Krähenbühl et al.
2023/0092821 A1 3/2023 Karhade et al.

FOREIGN PATENT DOCUMENTS

| CN | 1222792 C | 10/2005 |
| TW | 202221370 A | 6/2022 |
| TW | 202242463 A | 11/2022 |
| TW | I813409 B | 8/2023 |
| WO | 2017025515 A1 | 2/2017 |

* cited by examiner

*Primary Examiner* — Michael P Mooney

(74) *Attorney, Agent, or Firm* — Slater Matsil, LLP

(57) ABSTRACT

In some embodiments, a photonic device includes a photonic interconnect structure that includes a first cladding layer; a waveguide over the first cladding layer; a second cladding layer disposed over the waveguide; a transparent material in the first cladding layer and the second cladding layer, the transparent material includes a first sidewall adjacent to the waveguide and a second sidewall tilted with respect to the first sidewall of the transparent material; and a first reflective film over the second sidewall of the transparent material. In some embodiments, the photonic device also includes a light-receiving structure that includes a transparent protrusion above the transparent material, the transparent protrusion including a first sidewall and a second sidewall opposite to the second sidewall of the transparent protrusion; and a second reflective film over the second sidewall of the transparent protrusion and horizontally overlapping the first reflective film.

20 Claims, 27 Drawing Sheets

100

PHOTONIC DEVICE AND METHOD OF MANUFACTURE

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
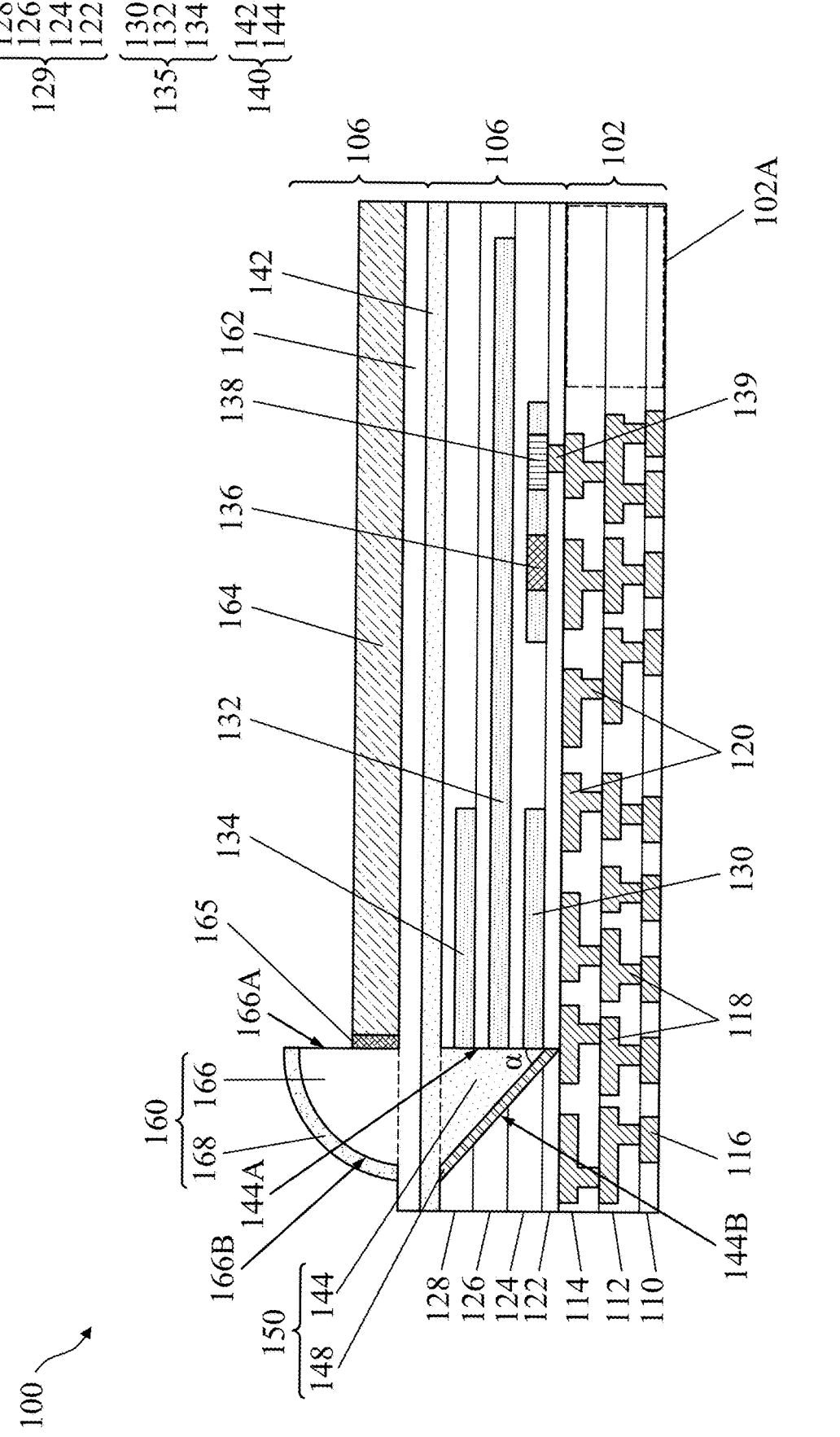
FIG. 1 illustrates a cross-sectional view of a photonic device, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various aspects of a photonic package and the formation thereof are described. Three-dimensional (3D) packages including both optical devices and electronic devices, and the method of forming the same, are provided, in accordance with some embodiments. Some embodiments include one or more electronic dies positioned over a hybrid interconnect structure that includes both electrical and optical communications networks. The optical network of the hybrid interconnect structure may include different types of waveguides and photonic components such as photodetectors, modulators, laser diodes, and the like. In some embodiments, a stack of hybrid interconnect structures forms a photonic package with multiple electrical and optical networks. The intermediate stages of forming the photonic packages are illustrated, in accordance with some embodiments. Some variations of some embodiments are discussed. Throughout the various views and illustrative embodiments, like reference numbers are used to designate like elements.

A photonic device including photonic components in accordance with some embodiments is provided. In some embodiments, the photonic device includes a vertical integration of an electrical interconnect structure, a photonic interconnect structure, and a light-receiving structure. The vertical integration of the electrical interconnect structure, the photonic interconnect structure, and the light-receiving structure may help the photonic device to have a reduced footprint and a compact size. In addition, the photonic device may transmit and process optical signals and electrical signals. The photonic device can be flexible to be integrated with other photonic devices or electronic devices in a package.

FIG. 1 illustrates a cross-sectional view of a photonic device 100, in accordance with some embodiments. The photonic device 100 may be part of a computing system (e.g., a photonic package 500 described below for FIG. 21 or the like). In some embodiments, the photonic device 100 provides an input/output (I/O) interface between optical signals and electrical signals in a computing system. In some embodiments, the photonic device 100 provides an optical network for signal communication between components (e.g., waveguides, integrated circuits, optical fibers, etc.).

The photonic device 100 includes an electrical interconnect structure 102, a photonic interconnect structure 104 over the electrical interconnect structure 102, and a light-receiving structure 106 over the photonic interconnect structure 104, in accordance with some embodiments. The electrical interconnect structure 102 may include any suitable number of dielectric layers, such as one or more plurality of dielectric layers (with three illustrated in FIG. 1). For example, three dielectric layers 110, 112, and 114 are illustrated in FIG. 1, although any number of dielectric layers may be implemented. The dielectric layers 110, 112, and 114 may independently include silicon oxide or a suitable low-k material, such as porous silicon oxide, organosilicate glass, hydrogen silesquioxane (HSQ), methyl silsesquioxane (MSQ), polysilsequioxane, or a combination thereof. Conductive features 116, 118, and 120 may be disposed in the dielectric layers 110, 112, and 114, respectively. In some embodiments, the conductive features 118 and 120 each include horizontal wiring features and conductive vias. The conductive vias may electrically connect to overlying or underlying conductive features. In some embodiments, the conductive features 116, 118, and 120 may include a liner layer (not shown), such as a diffusion barrier layer, an adhesion layer, a metal seed layer, a combination thereof, or the like. The liner layer may include TaN, Ta, Ti, TiN, Cu, a combination thereof, or the like. The conductive features 116, 118, and 120 may also include a low-resistance conductive material disposed over the liner layer. For example, the low-resistance conductive material may include Cu, Al, Co, Ag, Au, W, a combination thereof, or the like. In some embodiments, the conductive features 116 may be conductive pads and may be used for electrically connecting the photonic device 100 to other components (e.g., see FIG. 21).

In some embodiments, the electrical interconnect structure 102 includes a transparent area 102A that is free of conductive features, or also free of any active/passive device features. The transparent area 102A of the electrical interconnect structure 102 allows light to transmit through the electrical interconnect structure 102 without interference from the surrounding conductive features. As such, the photonic interconnect structure 104 and another photonic component positioned below the electrical interconnect structure 102 (e.g., waveguide 514, see FIG. 21) may communicate with each other using, e.g., grating couplers or, in embodiments in which the electrical interconnect structure 102 is thin enough, evanescent coupling between the waveguides within the photonic interconnect structure 104 and the underlying waveguides (e.g., waveguide 514 in FIG. 21). In some embodiments, the transparent area 102A has a surface area that is 10% to 30% of the surface area of the electrical interconnect structure 102 in a plan view. In some embodiments, the transparent area 102A of the electrical interconnect structure 102 includes at least a portion overlapping an overlapping area of the waveguide (e.g., second section 132 of waveguide 135) of the photonic interconnect structure 104 and another photonic component (e.g., the waveguide 514, see FIG. 21) disposed below the electrical interconnect structure 102.

The photonic interconnect structure 104 may be disposed over the electrical interconnect structure 102. The photonic interconnect structure 104 may include one or more cladding layers, and any number of waveguides may be disposed in any of these cladding layers. For example, in an embodiment illustrated in FIG. 1, four cladding layers 122, 124, 126, and 128 (collectively referred to as cladding layers 129) are illustrated, and waveguide 135 is disposed in the cladding layers 129 and surrounded by the cladding layers 129. In some embodiments, the waveguide 135 includes a first section 130 disposed in the cladding layer 124, a second section 132 disposed in the cladding layer 126, and a third section 134 disposed in the cladding layer 128. The respective sections of the waveguide 135 may be separated or connected to form a continuous structure, such as forming a meander structure or a loop (e.g., the waveguides may extend into and out of the drawing page). Any number of the sections and any suitable arrangements of the sections of the waveguide 135 can be implemented.

The refractive index of the material of the waveguide 135 is higher (e.g., greater than 0.5) than the refractive indices of the materials of the cladding layers 129. For example, the cladding layers 122, 124, 126, and 128 independently include silicon oxide, silicon oxynitride, silicon nitride, transparent glass polymer, a combination thereof, or the like. The cladding layers 122, 124, 126, and 128 may be formed of a same material, although different materials may be independently used. In some embodiments, the waveguide 135 includes silicon nitride, glass, silicon, polymer, combinations of these, or other suitable materials. For example, the cladding layers 129 are formed of silicon oxide, and the waveguide 135 is formed of silicon nitride, in accordance with some embodiments. Due to the difference in refractive indices of the materials of the waveguide 135 and the cladding layers 129, the waveguide 135 has high internal reflections, and light can be substantially confined within the waveguide 135 for transmitting optical signals. In some embodiments, the waveguides 135 may have a width ranging from 1 μm to 10 μm.

In some embodiments, the waveguide 135 includes a first section 130, a second section 132, and a third section 134 disposed in the cladding layers 124, 126, and 128, respectively. In some embodiments, the second section 132 may extend to overlap the transparent area 102A of the electrical interconnect structure 102. The first section 130 and the third section 134 may have a shorter length as compared to the second section 132. The first section 130 and the third section 134 may each have a tapered end so that the first section 130, the second section 132, and the third section 134 of the waveguide 135 may collectively form an edge coupler in order to receive and transmit light into and out of the photonic device 100. In particular, any of the first section 130, the second section 132, and the third section 134 may receive light, and any light within the first section 130 and the third section 134 may then be evanescently coupled into the second section 132 for transmission further into the photonic device 100. Similarly, to transmit light, light may be transmitted through the second section 132, and a portion of the light is evanescently coupled into both the first section 130 and the third section 134 so that the light can be sent out of each of the first section 130, the second section 132, and the third section 134.

Figure 21:
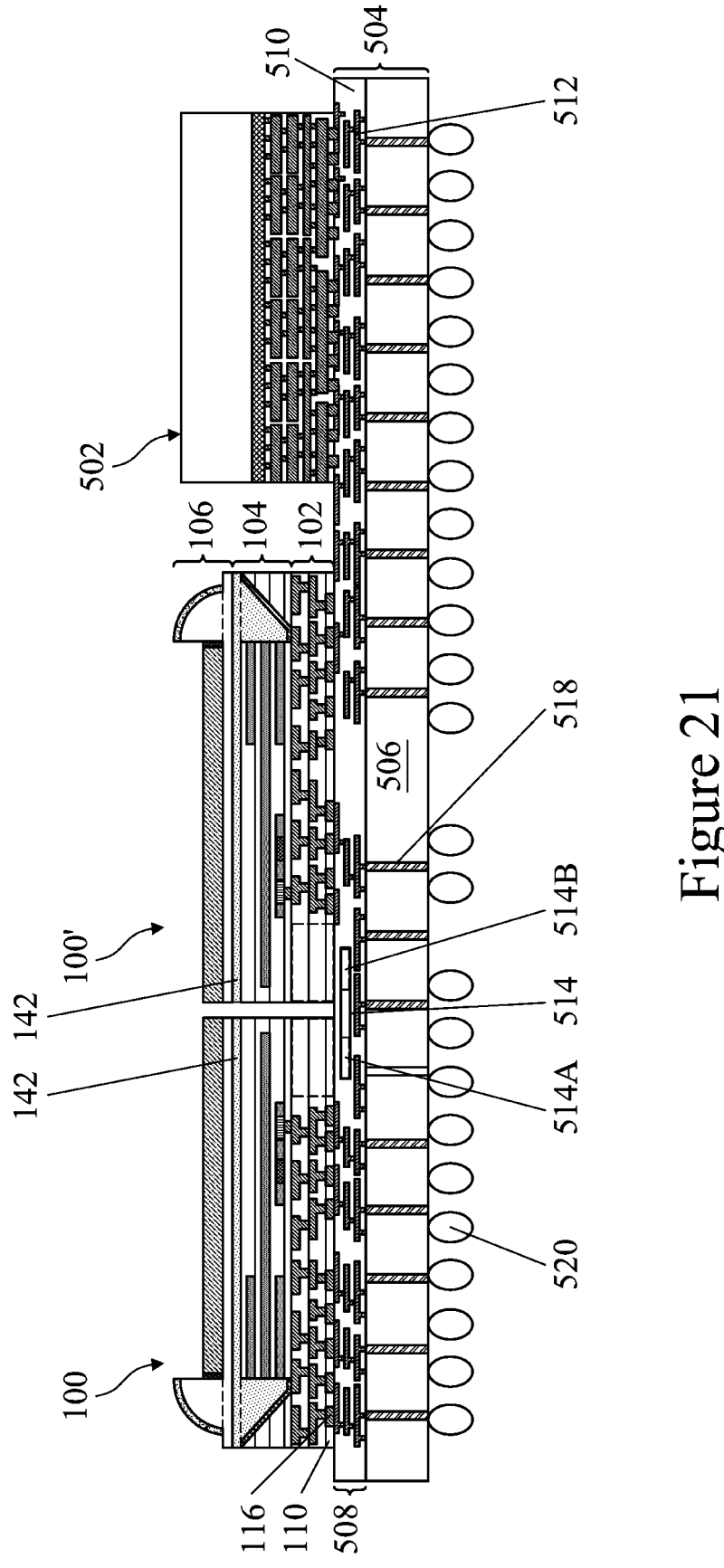
FIG. 21 illustrates a cross-sectional view of a photonic package, in accordance with some embodiments.

In some embodiments, at the other end of the second section 132, the second section 132 is positioned and shaped in order to help transmit in or out of the photonic device 100 through the transparent area 102A (e.g., from or to the waveguide 514 as illustrated in FIG. 21). In some embodiments in which the electrical interconnect structure 102 is too thick for evanescent coupling, the second section 132 may comprise a grating coupler in order to redirect the light through the transparent area 102A to a receiving grating coupler (not separately illustrated) located below the transparent area 102A.

In other embodiments in which the electrical interconnect structure 102 is thin enough to allow for evanescent coupling, the second section 132 may be located and shaped such that the second section 132 is coupled to the underlying waveguides. In such embodiments, the tapered end of the second section 132 of the waveguides 135 may have a tapering angle ranging from 0.1 degrees to 30 degrees with respect to the longitudinal direction of the waveguide 135.

In some embodiments, each of the waveguides within the first transparent layer 140 (e.g., the first section 130, the second section 132, and the third section 134), may also be independently coupled to other photonic components. For example, the photonic components may include a modulator 136 or a photodetector 138. The modulator 136 may receive optical signals from one or more of the waveguides 135 and generate corresponding optical signals. The photodetector 138 may detect optical signals from one or more sections of the waveguide 135 and generate electrical signals corresponding to the optical signals. In an embodiment, the photodetector 138 may be electrically coupled to the electrical interconnect structure 102, such as through a conductive via 139. Although in FIG. 1, the conductive via 139 only extends through the cladding layer 122, the conductive via 139 may extend through more cladding layers to a section of the waveguide 135 disposed in a higher-level cladding layer for electrically coupling the waveguide to the electrical interconnect structure 102. In some embodiments, the photonic components may also include amplifiers, multiplexors, demultiplexers, lasers, switches (e.g., Mach-Zehnder silicon photonic switches, microelectromechanical switches, micro ring resonators, etc.), combinations thereof, or the like.

Of course, the waveguides and components as illustrated in FIG. 1 are merely an example that is presented for illustration purposes and are not intended to limit the embodiments to the precise components and arrangements as they are presented herein. Rather, any other patterns or configurations of waveguides and other components may also be applied or implemented. All such combinations and configurations are fully intended to be included within the scope of the embodiments.

In some embodiments, a first transparent layer 140 is disposed over the uppermost cladding layer 128 of the photonic interconnect structure 104. The first transparent layer 140 may have a substantially planarized top surface (within process variations). The first transparent layer 140 may include an upper portion 142 disposed over the top surface of the cladding layer 128 and an extension 144 extending through or into one or more cladding layers of the photonic interconnect structure 104. A first reflective film 148 is disposed on a side of the extension 144 of the first transparent layer 140, in accordance with some embodiments. The first reflective film 148 and the extension 144 of the first transparent layer 140 may collectively form a first reflective structure 150 in the cladding layers of the photonic interconnect structure 104. The first reflective structure 150 may reflect and direct an incident light to the edge coupler formed by the first section 130, the second section 132, and the third section 134 of the photonic interconnect structure 104. In some embodiments, the first reflective film 148 can be omitted when the material of the first transparent layer 140 is sufficiently greater than (e.g., greater than 0.5) the refractive indices of the materials of cladding layers 122, 124, 126, and 128.

In some embodiments, the extension 144 of the first transparent layer 140 at least extends through the cladding layers 124, 126, and 128, or further extends into the cladding layer 122. The first transparent layer 140 (including extension 144) may include silicon oxide, silicon oxynitride, silicon nitride, a transparent glass polymer, GaN, SiC, a combination thereof, or the like. In some embodiments, the first transparent layer 140 is a same material as the cladding layers 129 of the photonic interconnect structure 104. The extension 144 of the first transparent layer 140 may have a first sidewall 144A adjacent to the waveguides 135 and a second sidewall 144B away from the waveguides 135. The first sidewall 144A of the extension 144 may have interfaces with the waveguide 135, though the extension 144 may be separated from the waveguide 135. In some embodiments, the first sidewall 144A of the extension 144 is a straight sidewall substantially perpendicular to the top surface of the cladding layer 128 or the bottom surface of the cladding layer 122, within process variations.

The second sidewall 144B of the extension 144 may be tilted with respect to the first sidewall 144A of the extension 144. The second sidewall 144B of the extension 144 may be a straight sidewall or a curved sidewall. In an embodiment the second sidewall 144B of the extension 144 is a straight sidewall such that the second sidewall 144B of the extension 144 intersects the first sidewall 144A of the extension 144 at an included angle $\alpha$. In some embodiments, the extension 144 of the first transparent layer 140 may have a flat bottom (see FIG. 20B), and a line including the second sidewall 144B of the extension 144 may intersect the first sidewall 144A of the extension 144 and have the included angle $\alpha$. The angle $\alpha$ may be in a range of 0.1 degrees to 90 degrees, such as 15 degrees to 75 degrees for allowing the first reflective film 148 disposed on the second sidewall 144B of the extension 144 to suitably reflect and direct the incident light to the waveguides 135. In some embodiments where the second sidewall 144B of the extension 144 is a curved sidewall, the second sidewall 144B of the extension 144 has a suitable curvature for allowing the first reflective film 148 disposed on the second sidewall 144B of the extension 144 to have suitable curvature for reflecting and directing incident light to the waveguides 135.

The first reflective film 148 may be disposed over the second sidewall 144B of the extension 144. For example, a top surface of the first reflective film 148 may be covered or buried by the extension 144 of the first transparent layer 140. As such, the first reflective structure 150 may have a triangular shape, a fan shape, a trapezoid shape, or the like in the cross-sectional view. The first reflective film 148 may be a single layer or a multi-layered structure. For example, the first reflective film 148 may be a single layer including a high refractive index material relative to the material of the first transparent layer 140, such as including a material having a refractive index greater than 2.0. In some embodiments, the first reflective film 148 includes Al, Cu, Ti, Ta, TaN, TiN, W. Ag, other high refractive materials, a combination thereof, or the like. In some embodiments, the first reflective film 148 may be a multi-layered structure, which includes alternating layers having suitable differences in refractive indices. In an embodiment, the multi-layered structure of the first reflective film 148 includes alternating layers of silicon oxide and silicon nitride. The first reflective film 148 may reflect an incident light to the waveguide 135. The top surface of the first reflective film 148 has a shape corresponding to the second sidewall 144B of the extension 144. For example, the first reflective film 148 may have a flat top surface when the second sidewall 144B of the extension 144 is a straight sidewall. In such embodiments, the first reflective film 148 may act as a flat mirror and have the included angle $\alpha$ with respect to the first sidewall 144A of the extension 144. In some embodiments, the first reflective film 148 may have a curved surface when the second sidewall 144B of the extension 144 is a curved sidewall. In such embodiments, the first reflective film 148 may act as a concave mirror that may condense the reflection light to condensed areas.

The light-receiving structure 106 is disposed over the photonic interconnect structure 104, such as over the first transparent layer 140, in accordance with some embodiments. The light-receiving structure 106 may include a second reflective structure 160, a second transparent layer 162, and an optical fiber 164. In some embodiments, the second reflective structure 160 and the optical fiber 164 may be disposed over the second transparent layer 162. The second reflective structure 160 may include a transparent protrusion 166 and a second reflective film 168. The second reflective structure 160 may reflect an incident light to the first reflective structure 150. For example, a light received by the light-receiving structure 106 (e.g., received and transmitted by the optical fiber 164) can be directed to the waveguide 135 of the photonic interconnect structure 104 by the reflection of the second reflective structure 160 and the first reflective structure 150, in accordance with some embodiments.

Figure 20A:
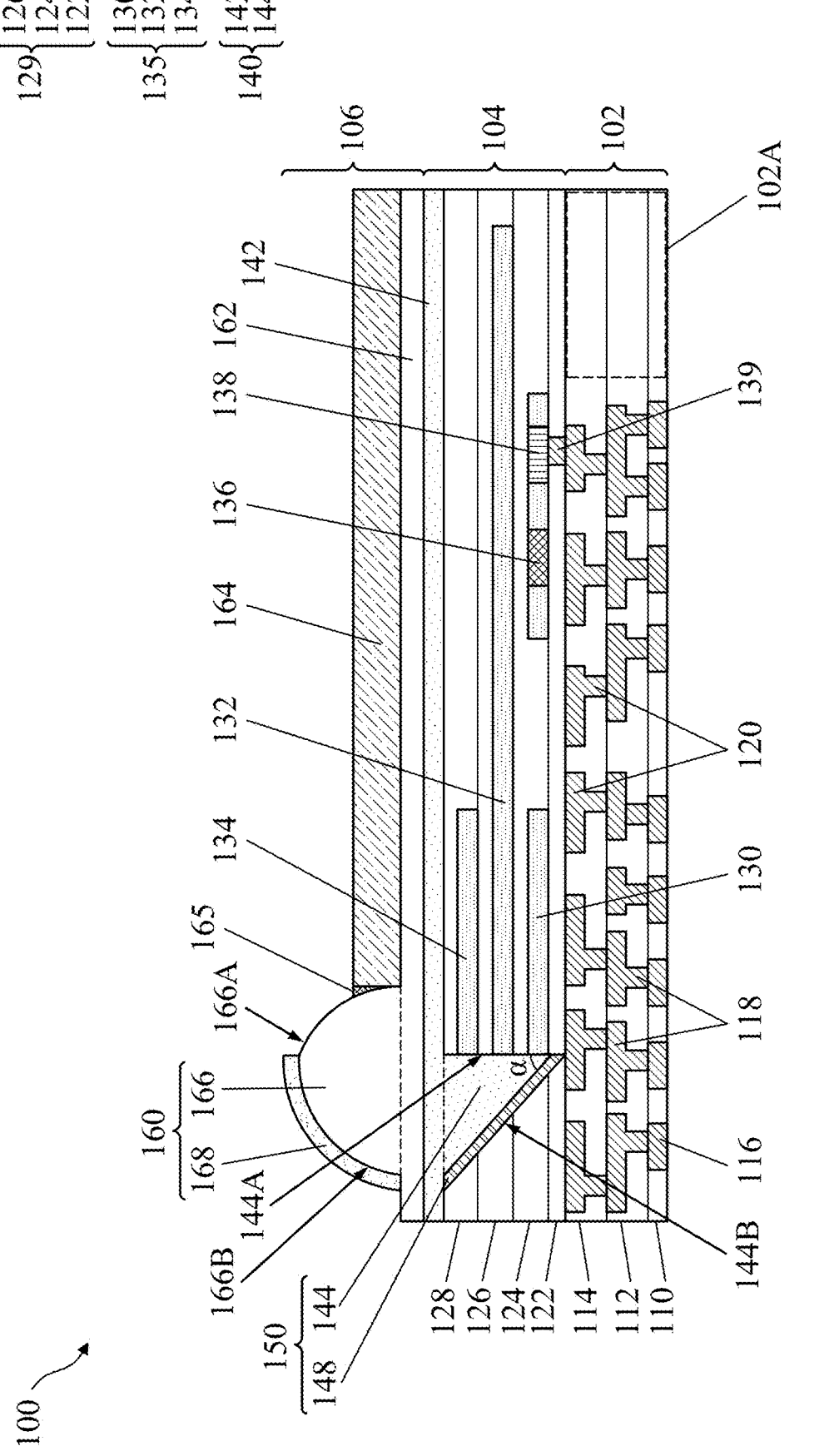
FIG. 20A to 20E illustrate cross-sectional views of photonic devices, in accordance with some embodiments.
Figure 20B:
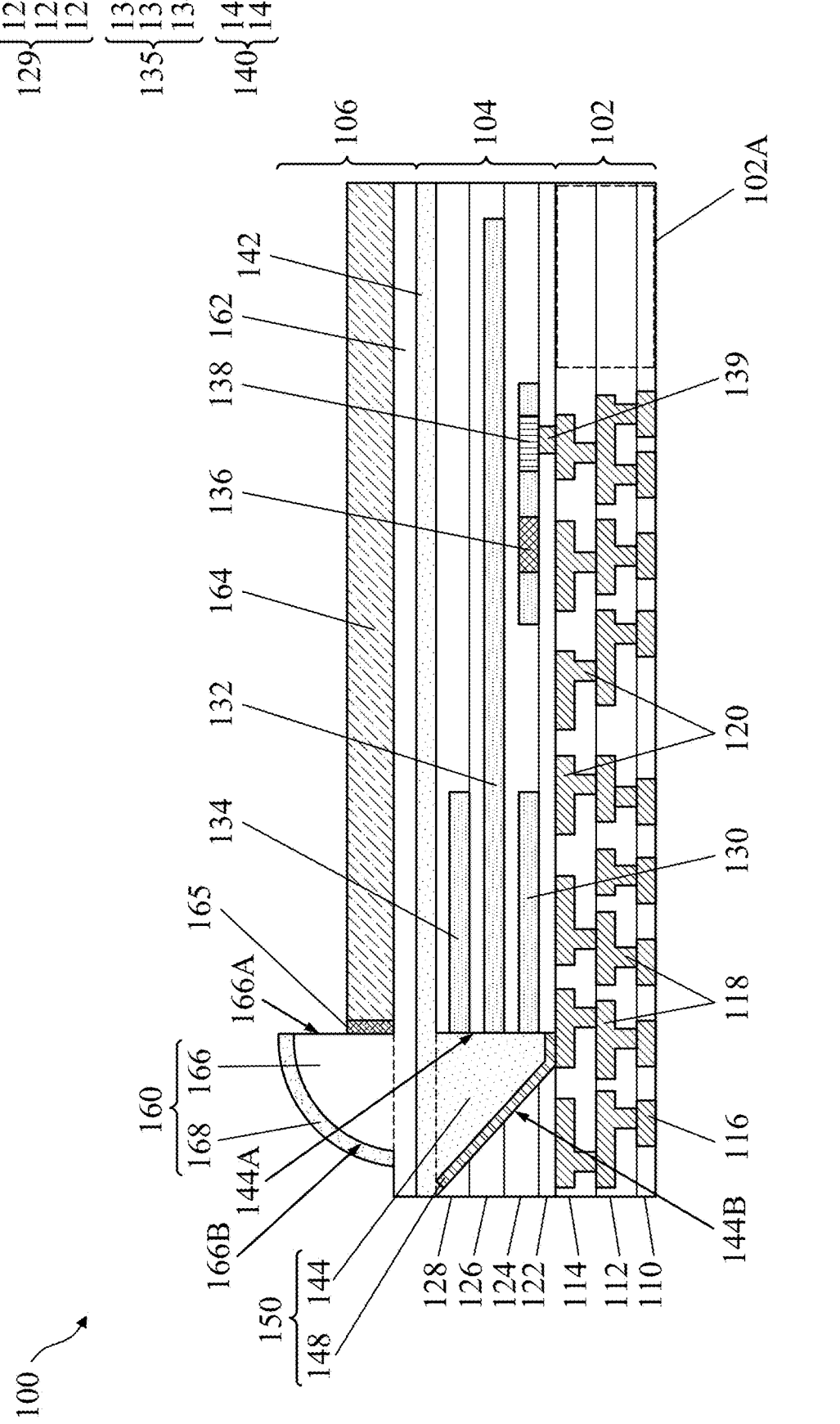

The transparent protrusion 166 may have a first sidewall 166A adjacent to the optical fiber 164 and a second sidewall 166B opposite the first sidewall 166A of the transparent protrusion 166, such as away from the optical fiber 164. The second sidewall 166B of the transparent protrusion 166 may be a curved sidewall. The second sidewall 166B may have a suitable curvature so that the second reflective film 168 disposed on the second sidewall 166B of the transparent protrusion 166 may have a corresponding suitable curvature for reflecting the incident light to the first reflective structure 150 below. In some embodiments, the first sidewall 166A of the transparent protrusion 166 is a straight sidewall or a curved sidewall. As illustrated in FIG. 1, the first sidewall 166A of the transparent protrusion 166 is a straight sidewall that may be substantially perpendicular (within process variations) to the top surface of the first transparent layer 140, and the transparent protrusion 166 has a quarter-circular shape or the like in the cross-sectional view. In some embodiments, as illustrated in FIG. 20A, the first sidewall 166A of the transparent protrusion 166 is a curved sidewall, and the transparent protrusion 166 may have a semi-circular shape or the like in the cross-sectional view, in accordance with some embodiments. In such embodiments, the first sidewall 166A and the second sidewall 166B as illustrated in FIG. 20A may have the same or different curvatures.

The transparent protrusion 166 may protrude from the second transparent layer 162. In some embodiments, the transparent protrusion 166 is an extension of the second transparent layer 162, with no intervening layer that may interfere with the light propagating path between the transparent protrusion 166 and the second transparent layer 162. In some embodiments, the transparent protrusion 166 is an independent piece attached to the second transparent layer 162, such as through an optical glue (not separately shown). The transparent protrusion 166 and the second transparent layer 162 may independently be silicon, or include silicon, glass, a combination thereof, or the like.

The second reflective film 168 is disposed over the second sidewall 166B of the transparent protrusion 166, in accordance with some embodiments. The second reflective film 168 may be a single layer or a multi-layered structure. For example, the second reflective film 168 may be a single layer including a high refractive index material, such as including a material having a refractive index greater than 2.0. In some embodiments, the second reflective film 168 includes Al, Cu, Ti, Ta, TaN, TiN, W, Ag, other high refractive materials, a combination thereof, or the like. In some embodiments, the second reflective film 168 may be a multi-layer structure, which includes alternating layers having a suitable difference in refractive indices. In an embodiment, the multi-layered structure of the second reflective film 168 includes alternating layers of silicon oxide and silicon nitride. A bottom surface of the second reflective film 168 has a shape corresponding to the second sidewall 166B of the transparent protrusion 166. For example, the second reflective film 168 may have a curved bottom surface and act as a concave mirror for reflecting the incident light between the optical fiber 164 and the first reflective structure 150 below. In some embodiments, the maximum width of the second reflective structure 160 is greater than the maximum width of the first reflective structure 150. In some embodiments, the second reflective structure 160 horizontally overlaps the first reflective structure 150. In some embodiments, the second reflective film 168 horizontally overlaps the first reflective film 148.

Figure 2A:
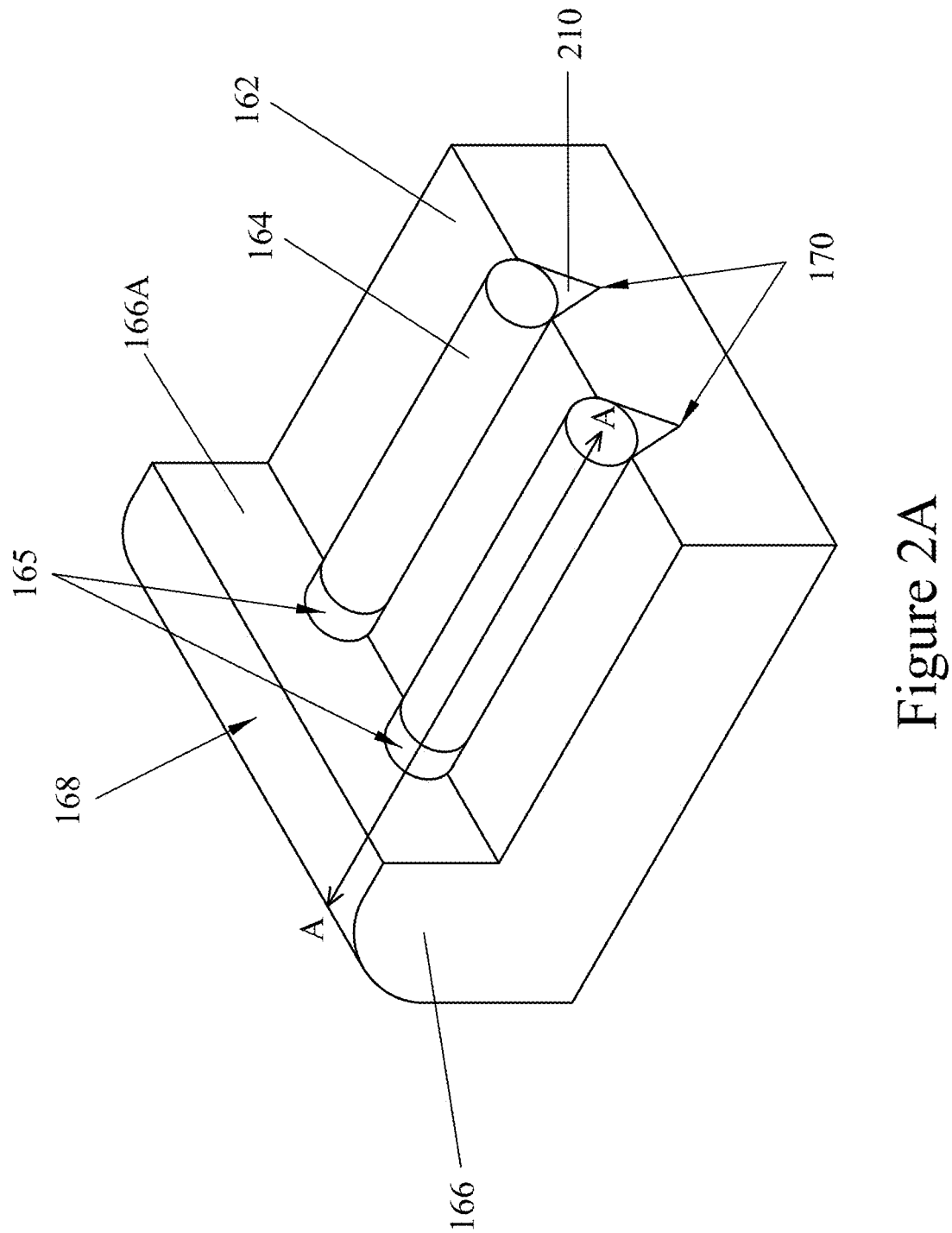
FIG. 2A illustrates a perspective view of a light-receiving structure of a photonic device, in accordance with some embodiments.
Figure 2B:
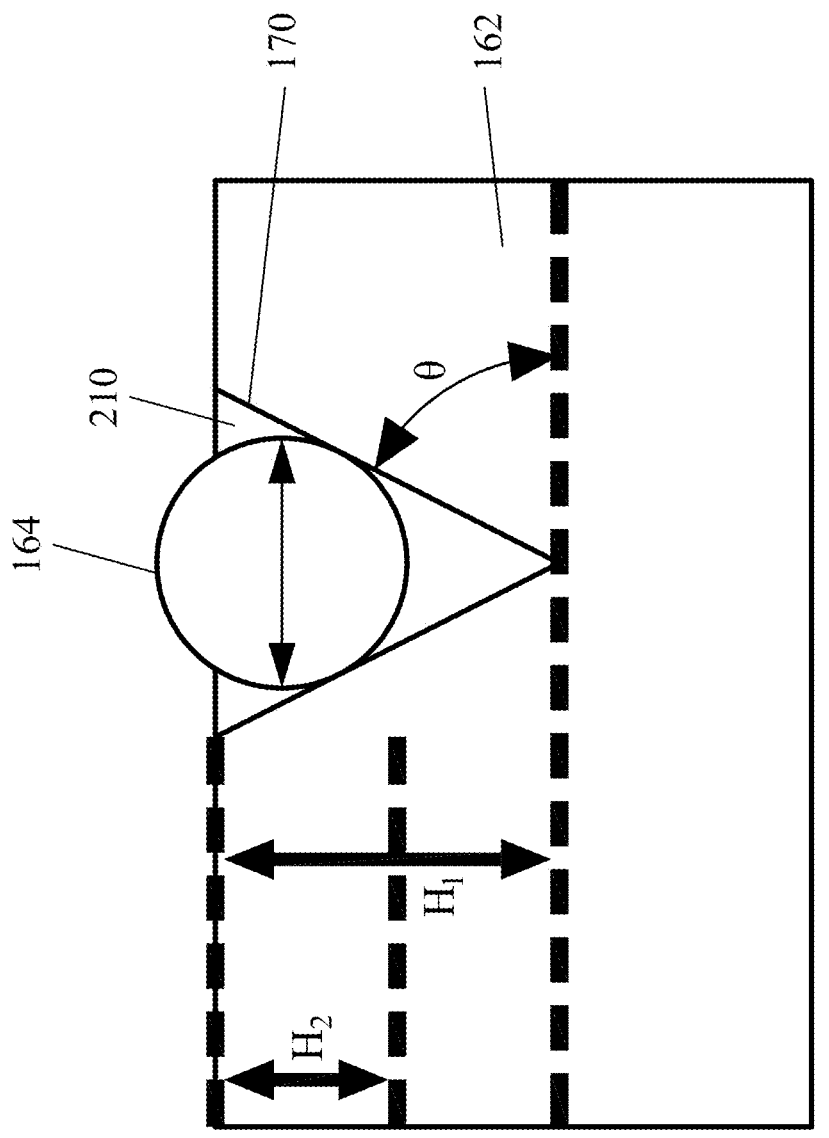
FIG. 2B illustrates a cross-sectional view of a light-receiving structure of a photonic device, in accordance with some embodiments.

In some embodiments, the optical fiber 164 is attached to the first sidewall 166A of the transparent protrusion 166. For example, an end of the optical fiber 164 may be attached to the first sidewall 166A of the transparent protrusion 166 through an optical glue 165. The optical fiber 164 may be a pipe extending in a longitudinal direction and have a circle or circle-like cross-section. The optical fiber 164 may include a glass material, a plastic material, or a combination thereof. In some embodiments, the optical fiber 164 may have a width W ranging from 10 mm to 300 mm. In some embodiments, the second transparent layer 162 has a flat top surface, and the optical fiber 164 is disposed on a flat top surface of the second transparent layer 162. In some embodiments, the second transparent layer 162 may have a groove 170 recessed from the top surface of the second transparent layer 162, and the optical fiber 164 is disposed in the groove 170 as illustrated in FIG. 2A. For example, the optical fiber 164 may have a least a portion (e.g., over a fifth of the width W) embedded in the groove 170. For example, FIG. 2A illustrates a perspective view of the light-receiving structure 106 in accordance with some embodiments, where FIG. 1 is a cross-sectional view according to a section A-A as illustrated in FIG. 2A. As shown in FIG. 2A, the optical fiber 164 is disposed in the groove 170 having a V-shape. It is also appreciated that the groove 170 may have other shapes, such as a U-shape or other suitable shapes. In some embodiments, the groove 170 may provide a precise alignment for the optical fiber 164. For example, the groove 170 may prevent or reduce the rolling of the optical fiber 164 when disposing the optical fiber 164. In addition, the groove 170 may be formed by suitable lithography and etching processes, and the position and size of the groove 170 can be precisely controlled. In some embodiments, an adhesive 210 (see FIG. 2A) may fill the remaining portions of the groove 170 not occupied by the optical fiber 164. FIG. 2B shows an enlarged cross-sectional view along the section B-B as illustrated in FIG. 2A. As illustrated in FIG. 2B, the groove 170 may have a height $H_1$ ranging from 200 μm to 500 μm, and the optical fiber 164 may have an embedded portion disposed within the groove 170, and the embedded portion of the optical fiber 164 has a height $H_2$ ranging from 50 μm to 150 μm. In some embodiments, a groove 170 and a surface parallel to the top surface of the second transparent layer 162 may have an included angle θ ranging from 10 degrees to 60 degrees. The angle θ may be adjusted to allow the optical fiber 164 to sit lower or higher (e.g., increase or decrease the height $H_2$) in the groove 170. For example, a smaller angle θ will lower the optical fiber 164, and a greater angle θ will raise the optical fiber 164, thereby changing the angle of the optical fiber 164 relative to the second reflective film 168.

In some embodiments, the optical fiber 164 is connected at another end (not illustrated in FIG. 1) to a light source in order to provide an optical pathway from outside of the photonic device 100 into the waveguide 135 of the photonic device 100. In some embodiments the light source may be a router of an optical network, a laser diode, a light-emitting diode (LED), other suitable light sources, or a combination thereof.

In some embodiments, the photonic device 100 includes a vertical integration of the electrical interconnect structure 102, the photonic interconnect structure 104, and the light-receiving structure 106. As such, light may propagate from the optical fiber 164 and be suitably directed to the waveguide 135 of the photonic interconnect structure 104 by the second reflective structure 160 and the first reflective structure 150. The photonic interconnect structure 104 may include the waveguide 135 and/or other photonic components to transmit the optical signals and convert the optical signals to suitable corresponding optical signals and/or electric signals. Also, the electrical interconnect structure 102 may include the transparent area 102A for the optical signals to propagate through and be vertically transmitted. In some embodiments, the vertical integration of the electrical interconnect structure 102, the photonic interconnect structure 104, and the light-receiving structure 106 helps the photonic device 100 have a reduced footprint and a compact size.

Figure 3:
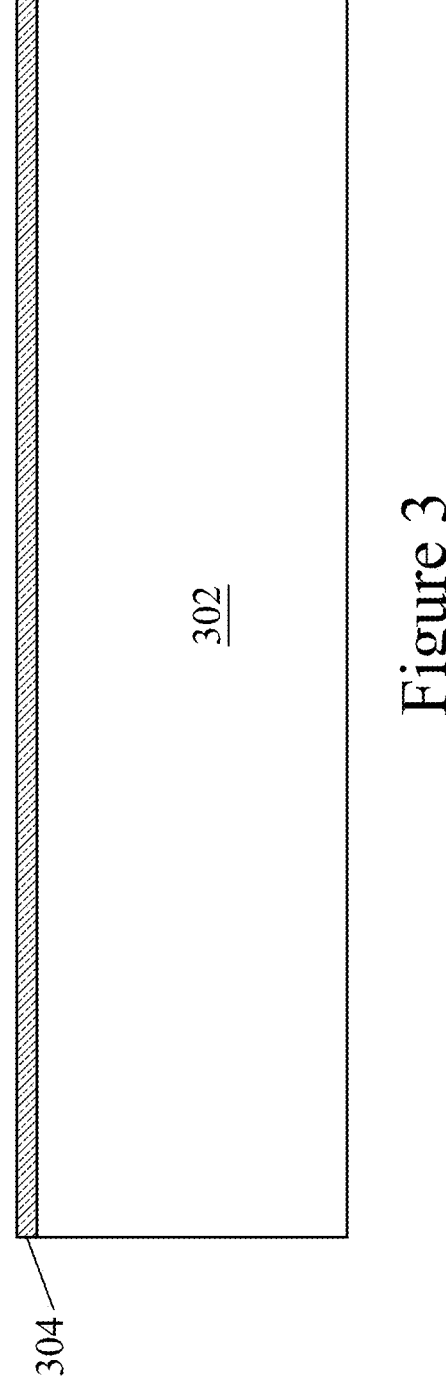
FIG. 3 through 19 illustrate cross-sectional views of intermediate steps of forming a photonic device, in accordance with some embodiments.

FIGS. 3 to 19 show cross-sectional views of intermediate steps of forming the photonic device 100 as illustrated in FIG. 1, in accordance with some embodiments. It is also appreciated the manufacturing steps may be applied to other embodiments of the photonic device 100, such as the embodiments of the photonic device 100 as illustrated in FIGS. 20A-20E. Turning first to FIG. 3, a substrate 302 is provided, in accordance with some embodiments. The substrate 302 may be, for example, a material such as a glass, ceramic, dielectric, a semiconductor, the like, or a combination thereof. In some embodiments, the substrate 302 may be a semiconductor substrate, such as a bulk semiconductor or the like, which may be doped (e.g., with a p-type or an n-type dopant) or undoped. The substrate 302 may be a wafer, such as a silicon wafer. Other substrates, such as a multi-layered or gradient substrate may also be used. In some embodiments, the semiconductor material of the substrate 302 may include silicon; germanium; a compound semiconductor including silicon carbide, gallium arsenic, gallium phosphide, indium phosphide, indium arsenide, and/or indium antimonide; an alloy semiconductor including SiGe, GaAsP. AlInAs, AlGaAs, GaInAs, GaInP, and/or GaInAsP; or combinations thereof. In some embodiments, a release layer 304 may be optionally formed on the substrate 302. The release layer 304 may be a thermal-release material, which may lose its adhesive property when heated, such as a light-to-heat-conversion (LTHC) release coating; an ultra-violet (UV) glue, which may lose its adhesive property when exposed to UV lights; or the like.

Figure 4:
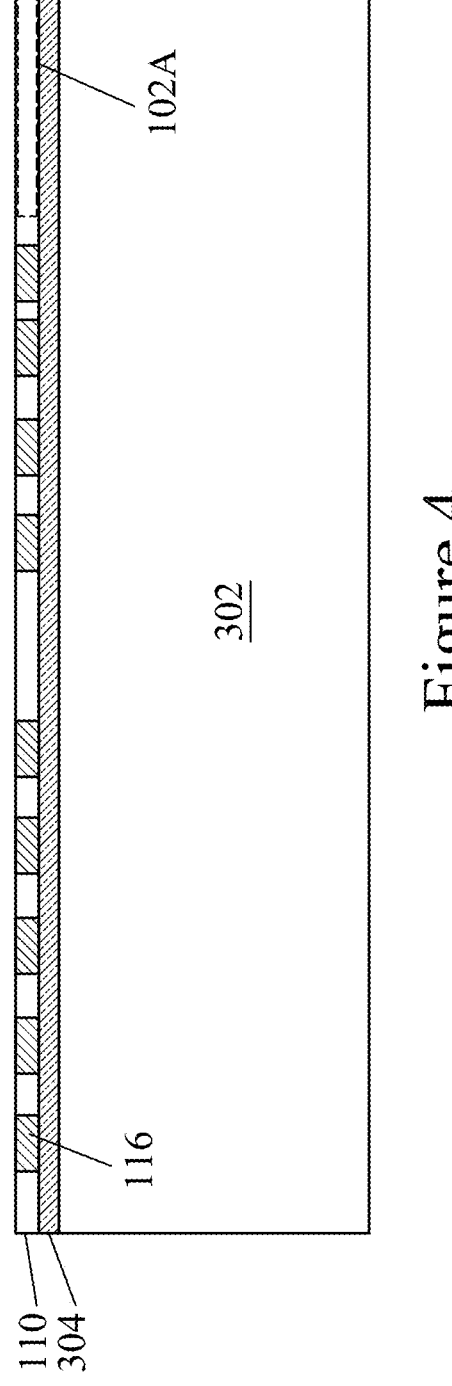
Figure 5:
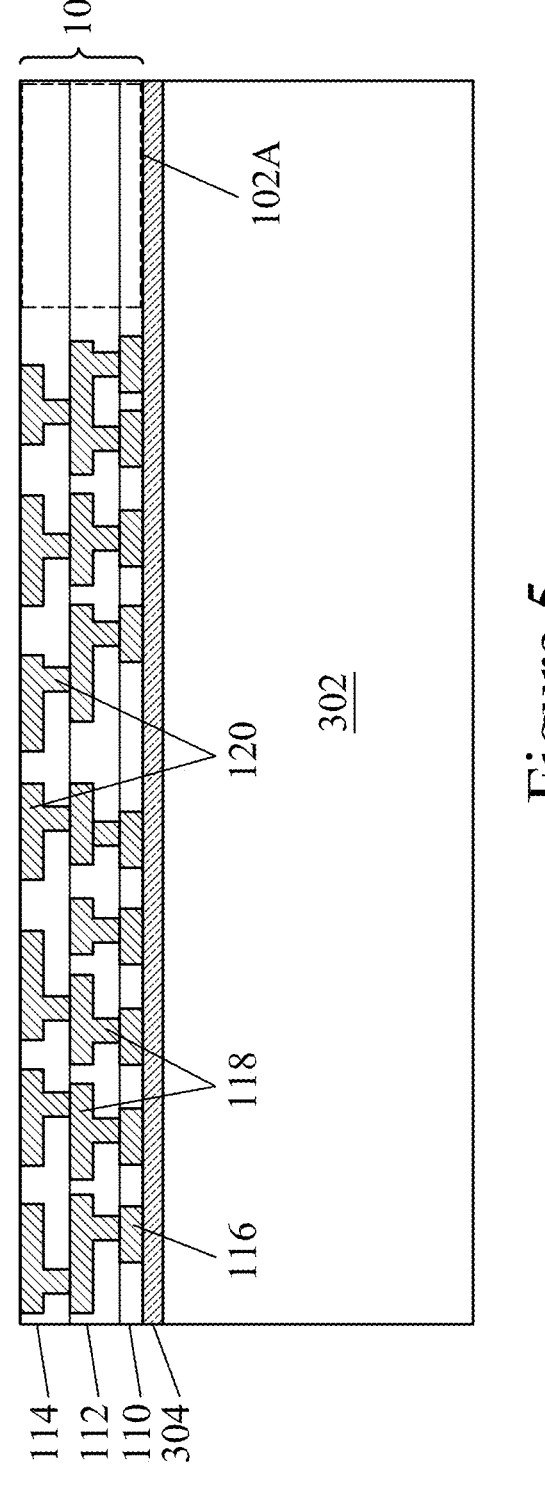

In FIGS. 4 and 5, the electrical interconnect structure 102 is formed over the substrate 302, in accordance with some embodiments. The formation of the electrical interconnect structure 102 may include forming the dielectric layer 110 over the substrate 302. For example, in FIG. 4, the dielectric layer 110 may be formed over the release layer 304. The dielectric layer 110 may be formed by suitable deposition or coating techniques. For example, the dielectric layer 110 may be formed by chemical vapor deposition (CVD), physical vapor deposition (PVD), atomic layer deposition (ALD), spin coating, dip coating, or a combination thereof, or the like.

The formation of the electrical interconnect structure 102 also includes forming openings in the dielectric layer 110, but not in the transparent area 102A. For example, a patterned mask (e.g., photoresist or a combination of photoresist and hard mask) may be formed over the dielectric layer 110, and an etching process such as a dry etching process and/or a wet etching process may be performed to form the openings according to the pattern of the patterned mask. In some embodiments, the openings in the dielectric layer 110 may have a shape corresponding to the conductive features 116. Next, a liner layer, which may include a barrier layer, an adhesion layer, and/or a seed layer, may be formed in the openings by a deposition method, such as CVD, PVD, or ALD. The liner may include Ta, TaN, Ti, TiN, Cu, a combination thereof, or the like. In some embodiments, a low-resistance conductive material is formed over the liner and fills the remaining portions of the openings in the dielectric layer 110. For example, the low-resistance conductive material may be formed by electroplating, electroless plating, CVD, PVD, a combination thereof, or the like. Excess materials of the liner layer and the low-resistance conductive material over a top surface of the dielectric layer 110 may be removed by a planarization process, such as chemical mechanical polishing (CMP). The liner layer and the low-resistance conductive material in the openings of the dielectric layer 110 may form the conductive features 116. In some embodiments, the dielectric layer 110 and the conductive features 116 may have a coplanar top surface for providing a flat platform for overlying layers being formed over the dielectric layer 110 and the conductive features 116.

Referring to FIG. 5, the formation of the electrical interconnect structure 102 may also include forming the dielectric layer 112 over the dielectric layer 110 and the conductive feature 116. The dielectric layer 112 may be formed by a method similar to the dielectric layer 110. In some embodiments, the conductive features 118 are formed in the dielectric layer 112. The conductive feature 118 may include wiring features and conductive vias, which may be formed using single damascene processes or dual damascene processes. For example, the openings for wiring features and openings for conductive vias may be formed in the dielectric layer 112 using suitable lithography and etching processes, and the liner layer and the low-resistance material may be filled into the openings for wiring features and openings for the conductive vias using a deposition process such as electroplating, electroless plating, PVD, CVD, a combination thereof, or the like. In some embodiments, the openings for the conductive wiring features and the openings for conductive vias are filled with the liner and the low-resistance material in a same deposition process. One or more planarization processes such as CMP may be performed to remove excess materials of the liner layer and the low-resistance conductive material over the top surface of the dielectric layer 112. In some embodiments, the formation of the electrical interconnect structure 102 also includes repeating the steps of forming the dielectric layer 112 and the conductive features 118 once for forming the dielectric layer 114 and the conductive features 120 over the dielectric layer 112 and the conductive features 118. The formation of the electrical interconnect structure 102 may also include repeating the steps of forming the dielectric layer 112 and the conductive features 118 more times for forming more levels of dielectric layers and conductive features over the dielectric layer 114 and the conductive features 120. The conductive features 118 may be formed using other processes. For example, the vias and the wiring features may be formed by separate processes, each in a separate dielectric layer. In some embodiments, none of the conductive features 116, none of conductive features 118, and none of the conductive features 120 are formed in the transparent area 102A.

Figure 6:
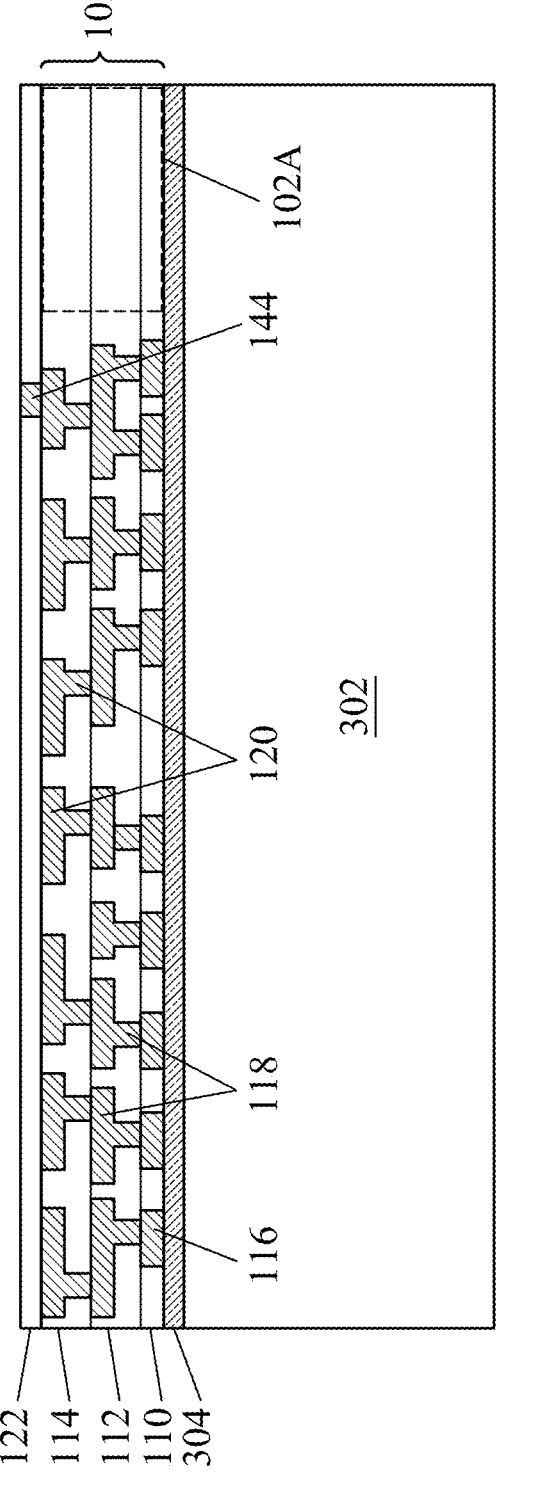

In FIGS. 6 to 14, the photonic interconnect structure 104 is formed over the electrical interconnect structure 102, in accordance with some embodiments. In FIG. 6, the cladding layer 122 is formed over the electrical interconnect structure 102, such as over the dielectric layer 114, in accordance with some embodiments. The cladding layer 122 may be formed by CVD, PVD, spin coating, dip coating, other suitable deposition or coating techniques, a combination thereof, or the like. In some embodiments, a conductive via 139 may be optionally formed in cladding layer 122. The conductive via 139 may be formed by suitable lithography, etching, and deposition processes, such as the damascene process similar to the methods of forming the conductive features 116, 118, or 120.

Figure 7:
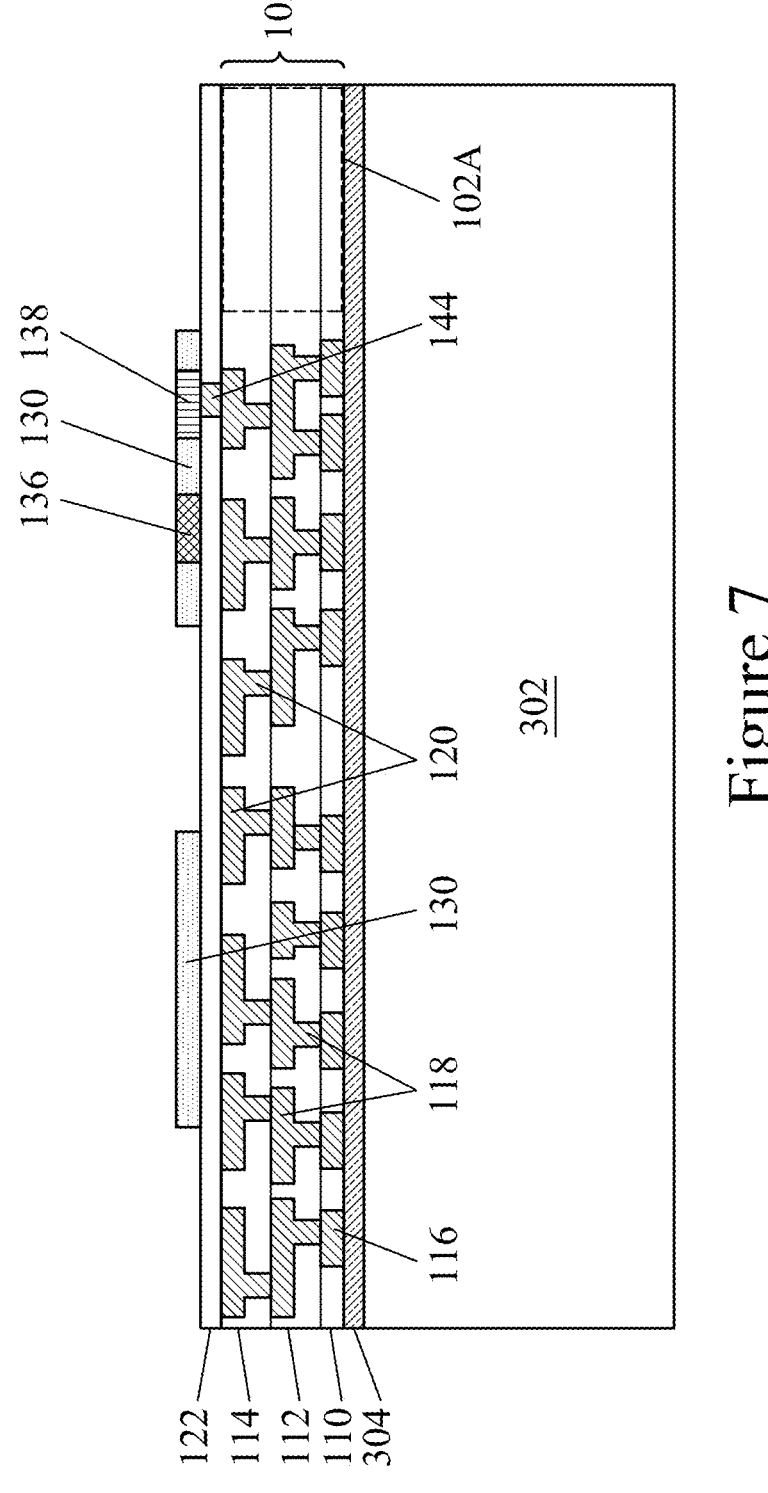

In FIG. 7, the first section 130 of the waveguide 135 is formed over the cladding layer 122, in accordance with some embodiments. The first section 130 of the waveguide 135 may be formed by suitable deposition processes and patterning processes. For example, a material of the waveguide 135 may be deposited over the cladding layer 122. A photoresist layer may be formed over the material of the waveguide 135 and patterned to have a pattern corresponding to the targeted pattern of the waveguide 135. The pattern of the photoresist layer may then be transferred to the material of the waveguide 135 using an etching process. For example, the material of the waveguide 135 may be etched to form recesses defining the first section 130 of the waveguide 135, with sidewalls of the remaining unrecessed portions defining sidewalls of the first section 130 of the waveguide 135. The etching process may include, for example, a dry etching process, a wet etching process, or a combination thereof.

Figure 8:
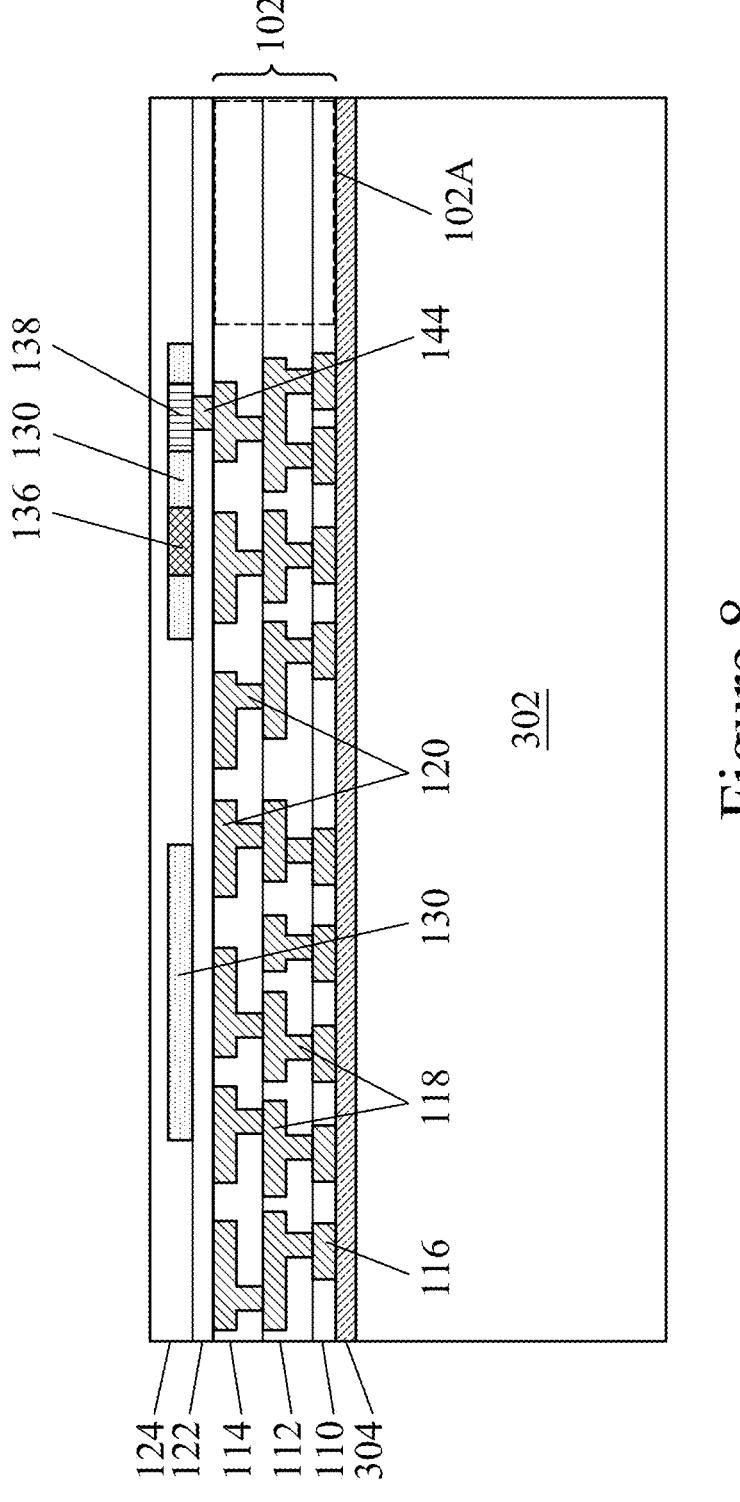

In FIG. 8, the cladding layer 124 is formed over the first section 130 of the waveguide 135 and the cladding layer 122, in accordance with some embodiments. The cladding layer 124 may be formed by a method similar to the cladding layer 122. A planarization process, such as a CMP process or a grinding process, may be performed on the top surface of the as-deposited material of the cladding layer 124 for providing the cladding layer 124 with a substantially planarized top surface, within process variations. After the planarization process, the cladding layer 124 may have a thickness greater than the thickness of the first section 130 of the waveguide 135 so that the top surface of the first section 130 may still be buried or covered by the cladding layer 124.

Figure 9:
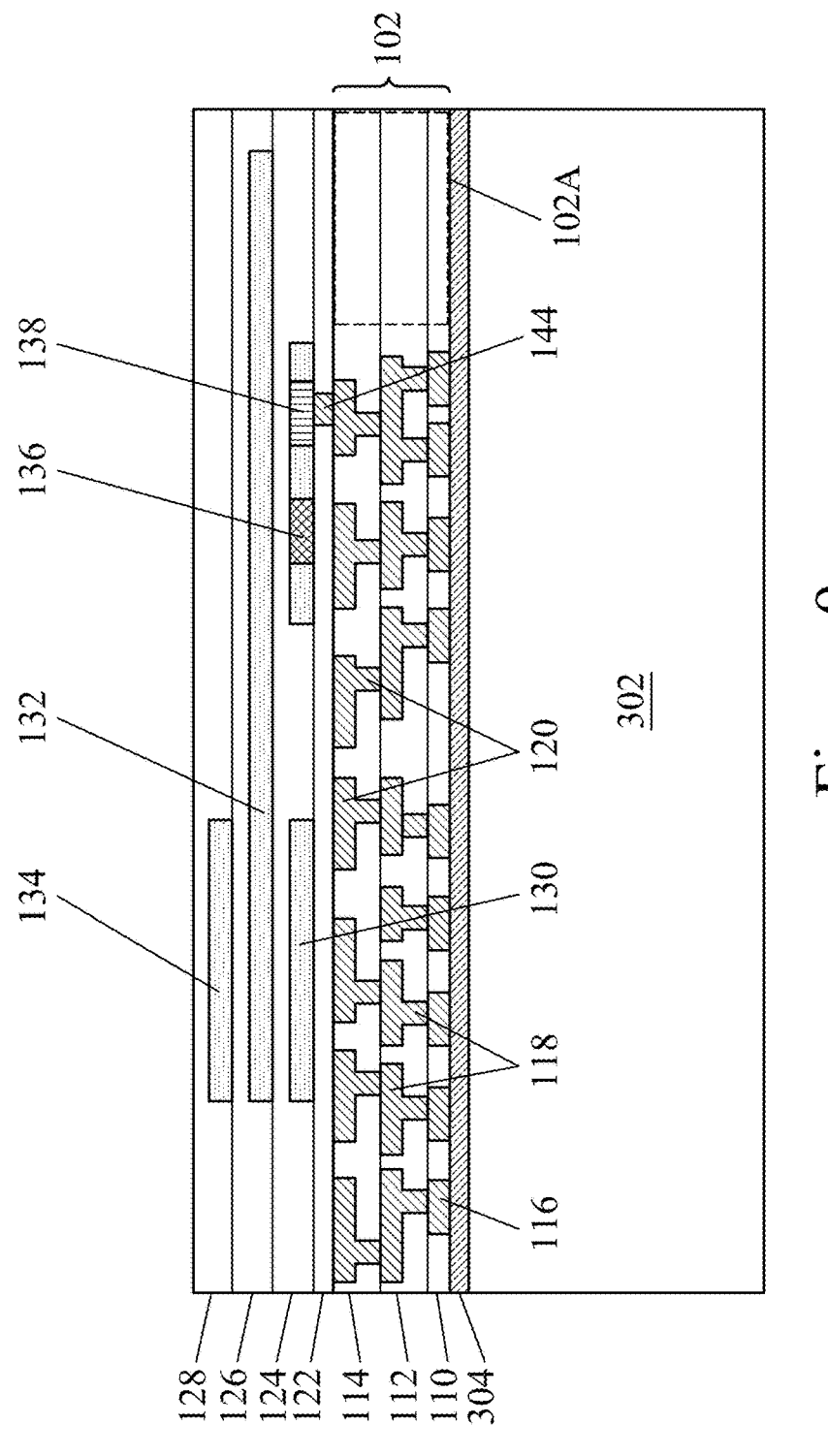

In some embodiments, referring to FIG. 9, the steps of forming the first section 130 of the waveguide 135 and the cladding layer 122 as illustrated in FIGS. 7 and 8 may be repeated to form more levels of waveguide sections and cladding layers. For example, in the illustrated embodiments, the steps of forming the first section 130 of the waveguide 135 and the cladding layer 122 may be repeated two times for forming the second section 132 of the waveguide 135 in the cladding layer 126 and the third section 134 of the waveguide 135 in the cladding layer 128. It is also appreciated that the steps of forming any sections of the waveguide 135, and any layers of the cladding layers 122, 124, 126, and/or 128 may be repeated more times for forming more sections and levels of waveguides and cladding layers. In some embodiments, the photonic components such as the modulator 136, the photodetector 138, or other photonic components, such as Mach-Zehnder silicon-photonic switches, microelectromechanical switches, micro-ring resonators, amplifiers, multiplexors, demultiplexers, optical-to-electrical converters (e.g., P-N junctions), electrical-to-optical converters, lasers, combinations of these, or the like may be formed by any suitable manners and can be formed before or after the forming the waveguide 135.

Figure 10:
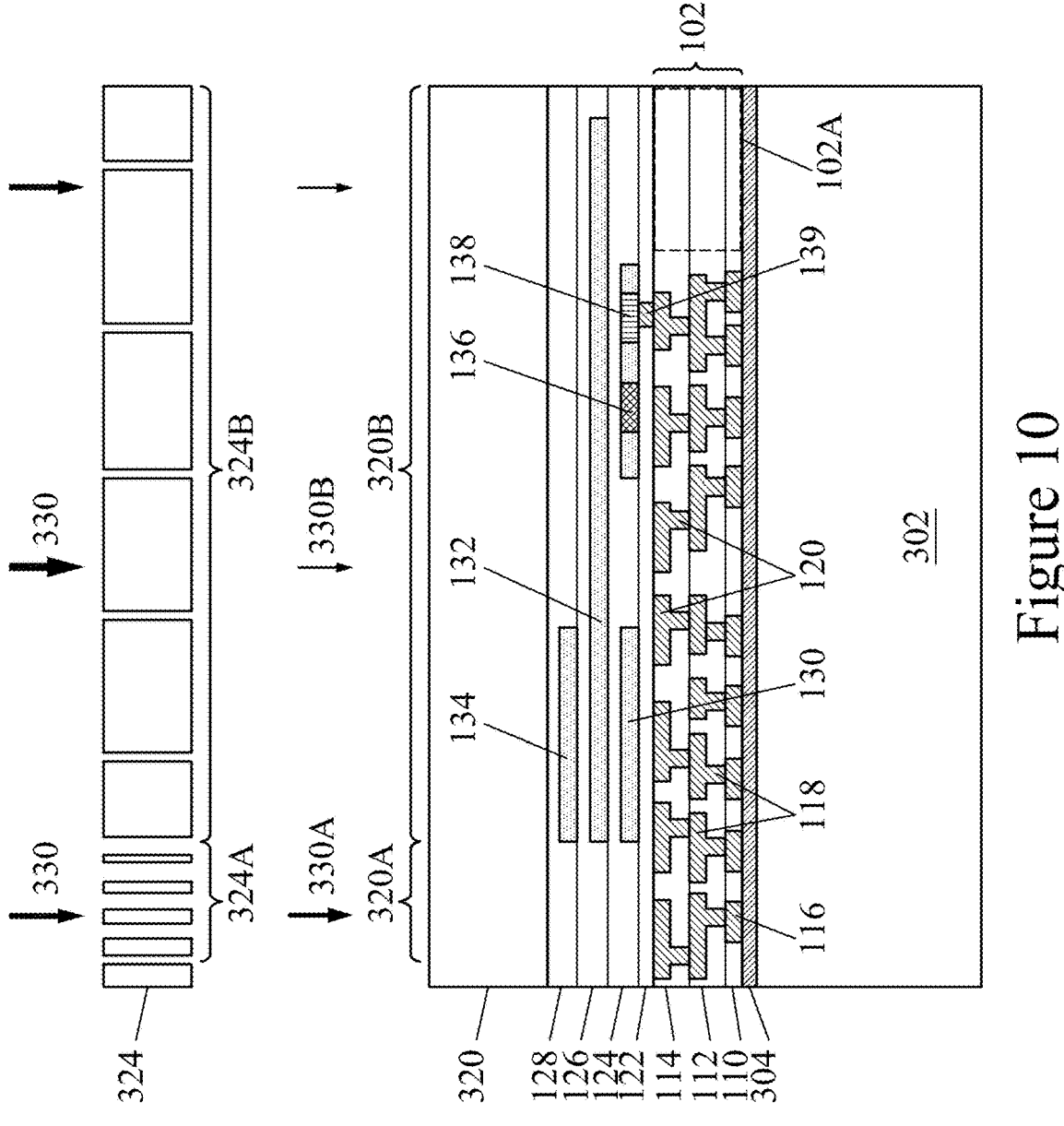
Figure 11:
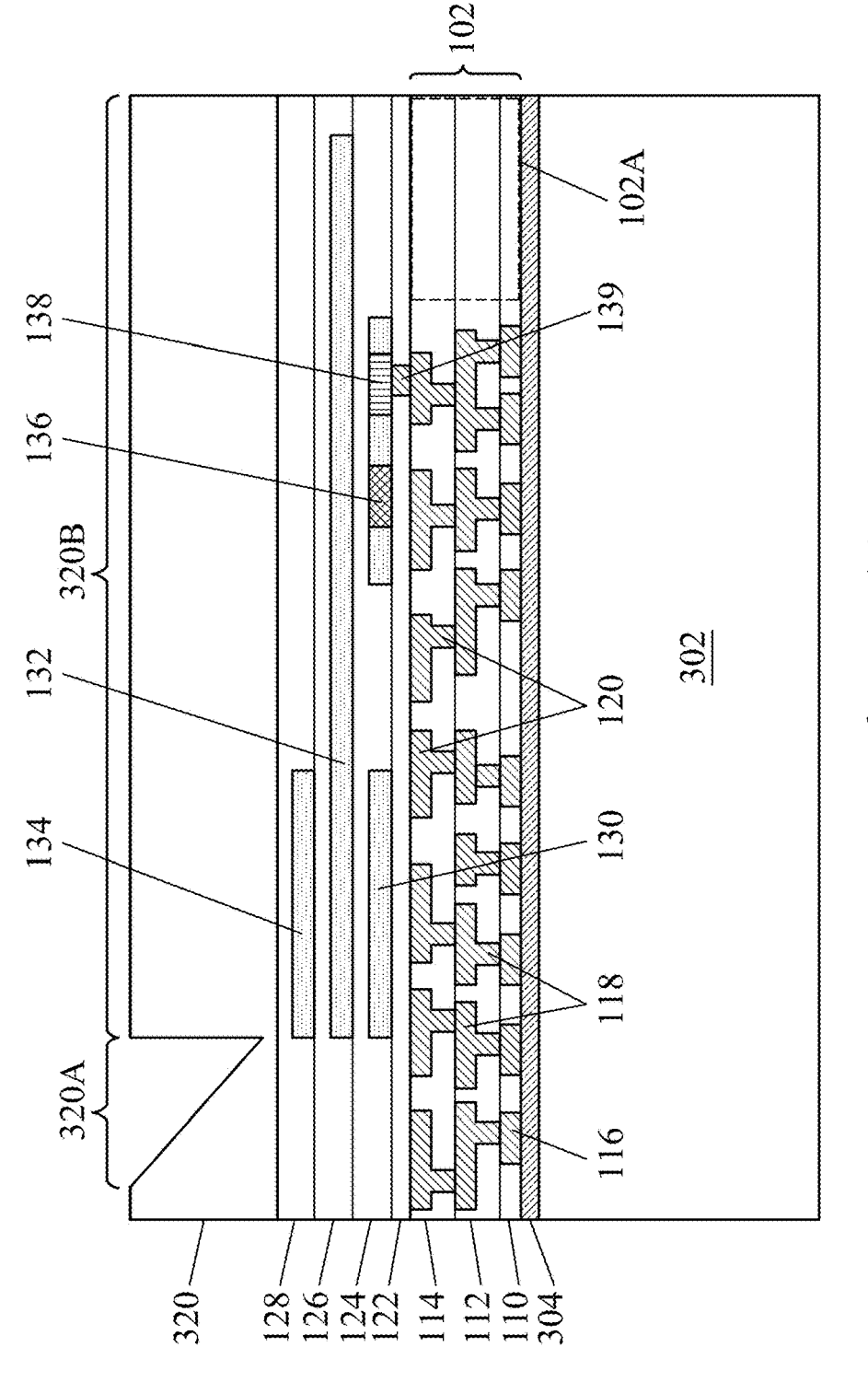
Figure 12:
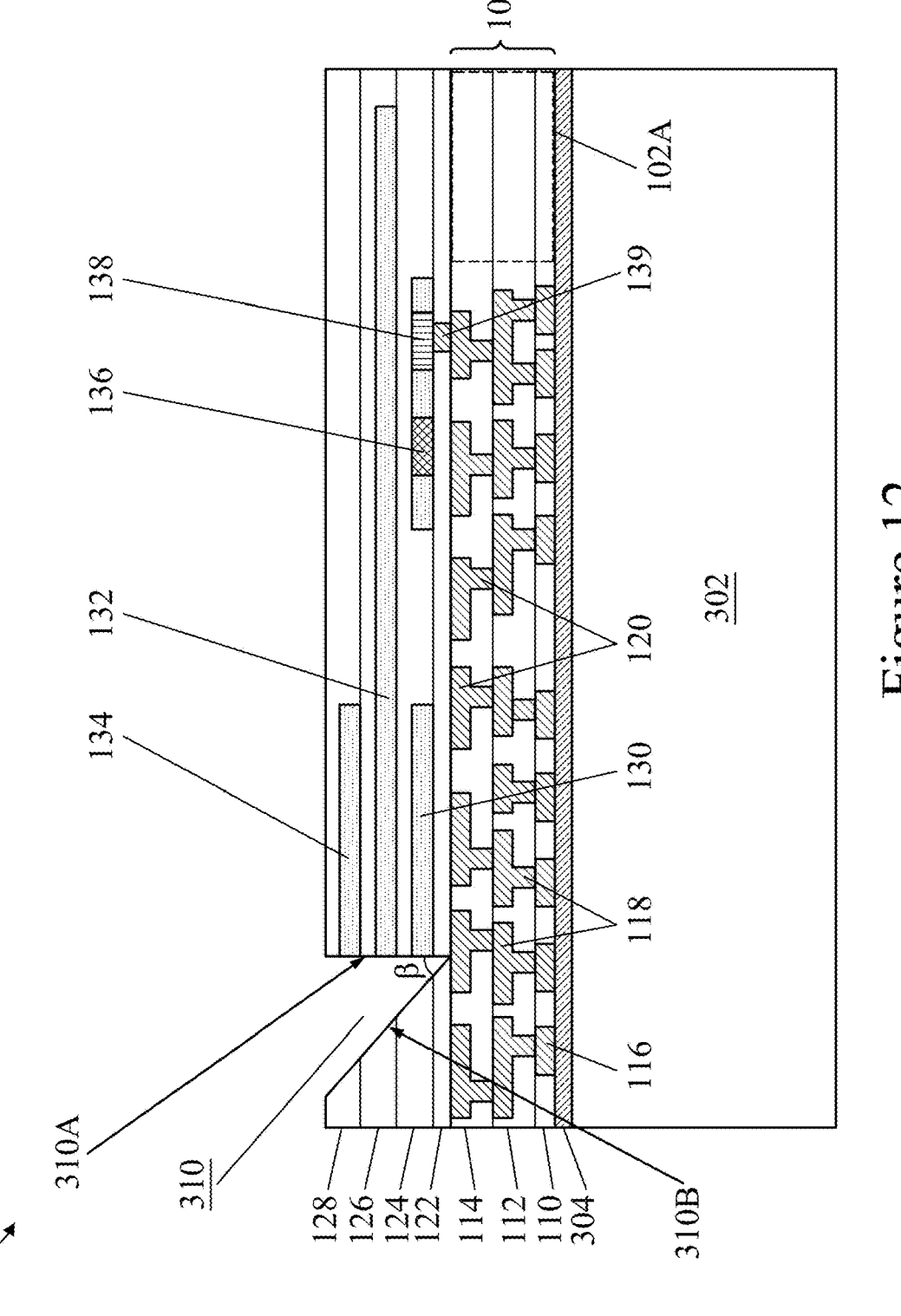

In FIGS. 10 to 12, a trench 310 (see FIG. 12) is formed in the photonic interconnect structure 104, in accordance with some embodiments. The trench 310 may extend from a top surface of the cladding layer 128 and through at least one of the cladding layers 122, 124, 126, or 128. For example, in the illustrated embodiments, the trench 310 may extend through the cladding layer 128, the cladding layer 126, and the cladding layer 124. The trench 310 may also extend into or through the cladding layer 122. In some embodiments, the trench 310 exposes a sidewall of one or more sections of the waveguide 135. In some embodiments, the trench 310 may have a triangular shape, a fan shape, a trapezoidal shape, or the like. For example, the trench 310 may have a first sidewall 310A that is adjacent to the waveguide 135 and perpendicular to a top surface of the electrical interconnect structure 102 (e.g., top surface of the dielectric layer 114). The trench 310 may also have a second sidewall 310B away from the waveguide 135 and tilted with the first sidewall 310A of the trench 310. The second sidewall 310B of the trench 310 is a straight sidewall or a curved sidewall. In an embodiment that the second sidewall 310B of the trench 310 is a straight sidewall, the second sidewall 310B of the trench 310 may intersect the first sidewall 310A of the trench 310 and have an included angle β. In some embodiments, the trench 310 may have a flat bottom, and a line including the second sidewall 310B of the trench 310 may intersect the first sidewall 310A of the trench 310 and have the included angle β (see FIG. 12). The angle β may be in a range of 0.1 degrees to 90 degrees. The angle β may be equal to the angle α(see FIG. 1). In some embodiments that the second sidewall 310B of the trench 310 is a curved sidewall and has a suitable curvature.

For example, referring to FIG. 10, a photoresist layer 320 is formed over the cladding layer 128. In some embodiments, the photoresist layer 320 includes a low-light-sensitive photoresist (or referred to as low contrast photoresist). In some embodiments, the photoresist layer 320 includes a polymer material or an oligomer material that may be strengthened (e.g., cross-linked) or degraded (e.g., de-cross-linked) by being exposed to a wavelength range of light, and the extent of the strengthening or degrading for the low-light-sensitive photoresist may be positively related or proportional to the amount of the light exposure.

Next, referring to FIG. 10, the photoresist layer 320 is exposed to a light that passes through a photomask 324, in accordance with some embodiments. The photomask 324 may be a multi-tone mask. For example, the photomask 324 may include one or more grating portions to have different light transmittance at these grating portions of the photomask 324. For example, the photomask 324 includes a first grating portion 324A and a second grating portion 324B, in accordance with some embodiments. The first grating portion 324A and the second grating portion 324B of the photomask 324 may have different light transmittance, which may be adjusted by the size of openings, pitches of adjacent openings, and the density of openings. The first grating portion 324A and the second grating portion 324B may abut together to form a continuous structure. The first grating portion 324A and the second grating portion 324B, either alone or in combination, may have a fixed light transmittance or a gradient transmittance (e.g., horizontally graded from one position to another position). In the illustrated embodiment, the first grating portion 324A may have a gradient light transmittance, and the second grating portion 324B may have a uniform light transmittance. In some embodiments, the photomask 324 may include more grating portions though they are not illustrated in FIG. 10. Accordingly, a light radiation 330 passing through the first grating portion 324A and the second grating portion 324B may have different amounts (e.g., intensity) remaining after passing through the photomask 324. For example, as illustrated in FIG. 10, the remaining amount 330A (e.g., intensity) of the light radiation 330 passing through the first grating portion 324A of the photomask 324 may be greater than the remaining amount 330B (e.g., intensity) of the light radiation 330 passing through the second grating portion 324B of the photomask 324. By exposure to the light passing through the photomask 324, different portions of the photoresist layer 320 may have different physical properties. In some embodiments, the extent of change of a first portion 320A of the photoresist layer 320 that is exposed to the light radiation 330 passing through the first grating portion 324A of the photomask 324 is greater than the extent of change of a second portion 320B of the photoresist layer 320 being exposed to the light radiation 330 passing through the second grating portion 324B of the photomask 324. The extent of change in the first portion 320A of the photoresist layer 320 may have a gradient profile.

In FIG. 11, the photoresist layer 320 is developed, and portions of the photoresist layer 320 are removed, in accordance with some embodiments. In some embodiments, the remaining material of the first portion 320A of the photoresist layer 320 may have a gradually increased thickness from a side adjacent to the waveguide 135 to a side away from the waveguide 135, while the second portion 320B of the photoresist layer 320 may have a uniform thickness. In some embodiments, the portions of the photoresist layer 320 are removed by a suitable solvent, such as aqueous ammonia tetraethylammonium hydroxide, sodium hydroxide, potassium hydroxide, sodium carbonate, sodium silicate, sodium metasilicate, organic amine, or a combination thereof.

In FIG. 12, an etching process is performed for transferring the pattern of the photoresist layer 320 to the underlying layers, thereby forming the trench 310, in accordance with some embodiments. For example, when performing the etching process, the photoresist layer 320 may be consumed, and the portion of the photoresist layer 320 having a relatively thinner thickness would be completely consumed to form an opening exposing the underlying layer sooner than the portion of the photoresist layer 320 having a relatively thicker thickness. Accordingly, the etching depths of different portions of the underlying layers at different positions may be positively related or proportional to the thicknesses of the photoresist layer 320. For example, the trench 310 may have a shape corresponding to the thicknesses of the first portion 320A of the photoresist layer 320. The trench 310 may have gradually decreased depths from the first sidewall 310A of the trench 310 to the second sidewall 310B of the trench 310.

Figure 13:
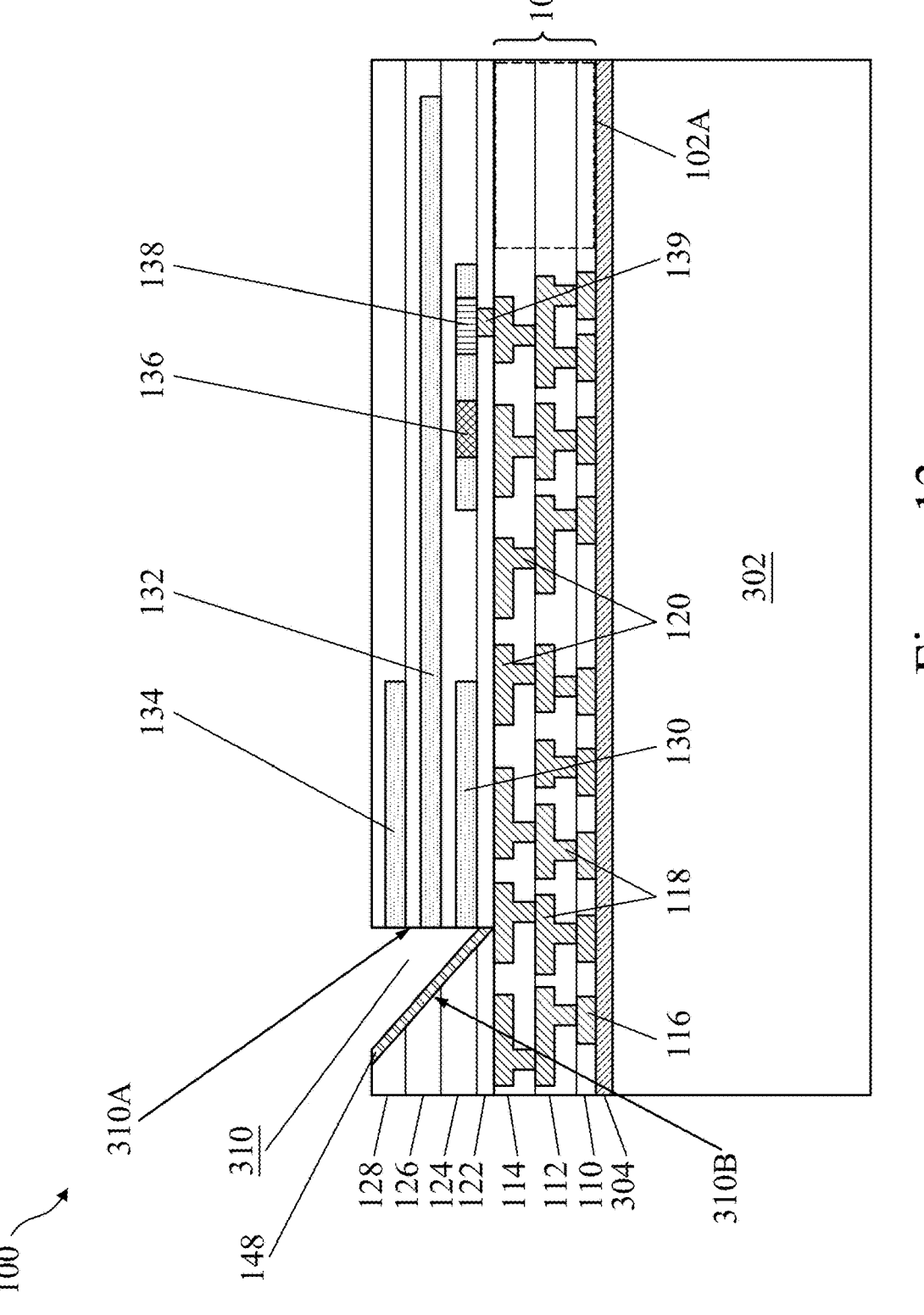
Figure 20C:
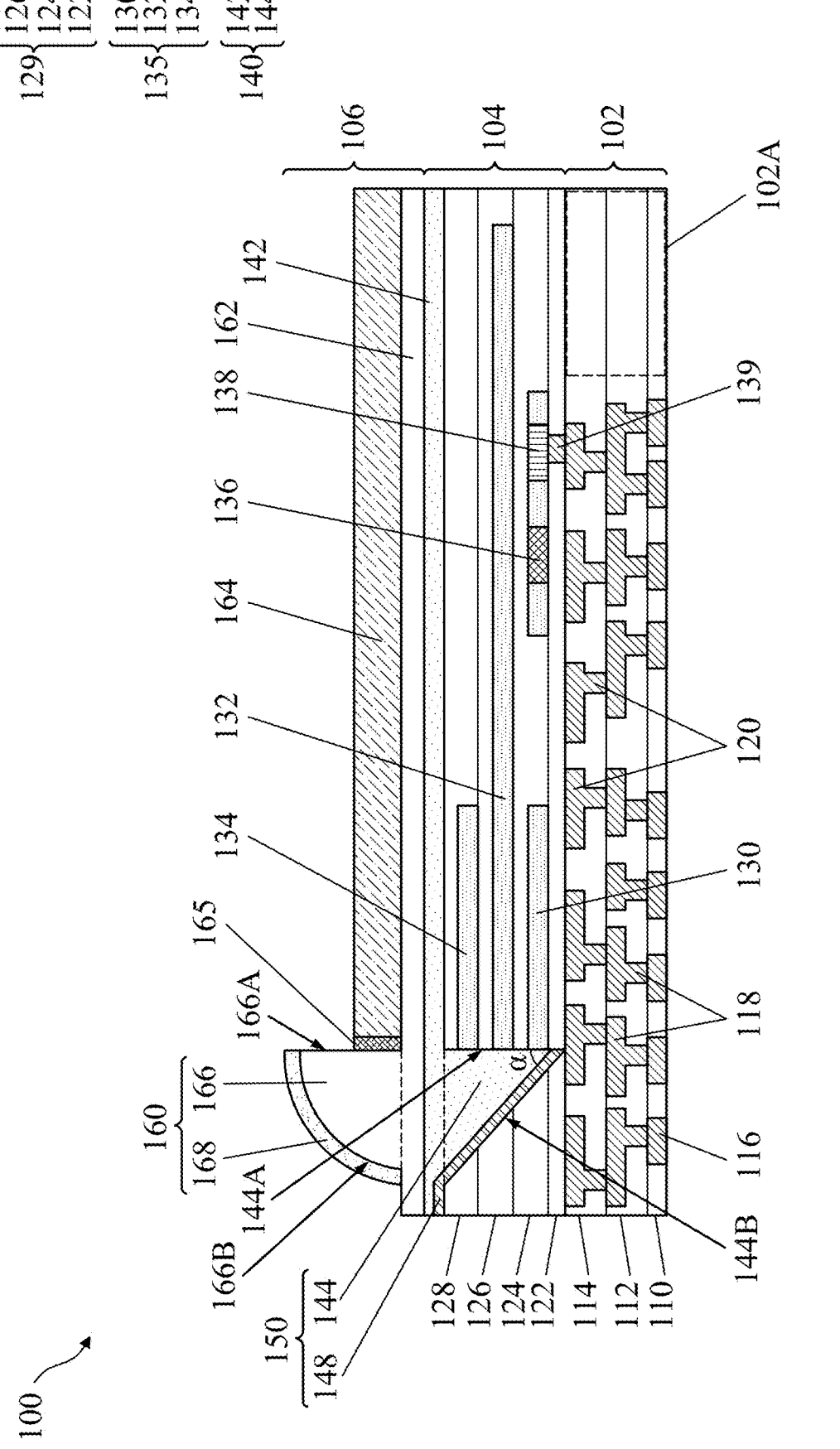
Figure 20D:
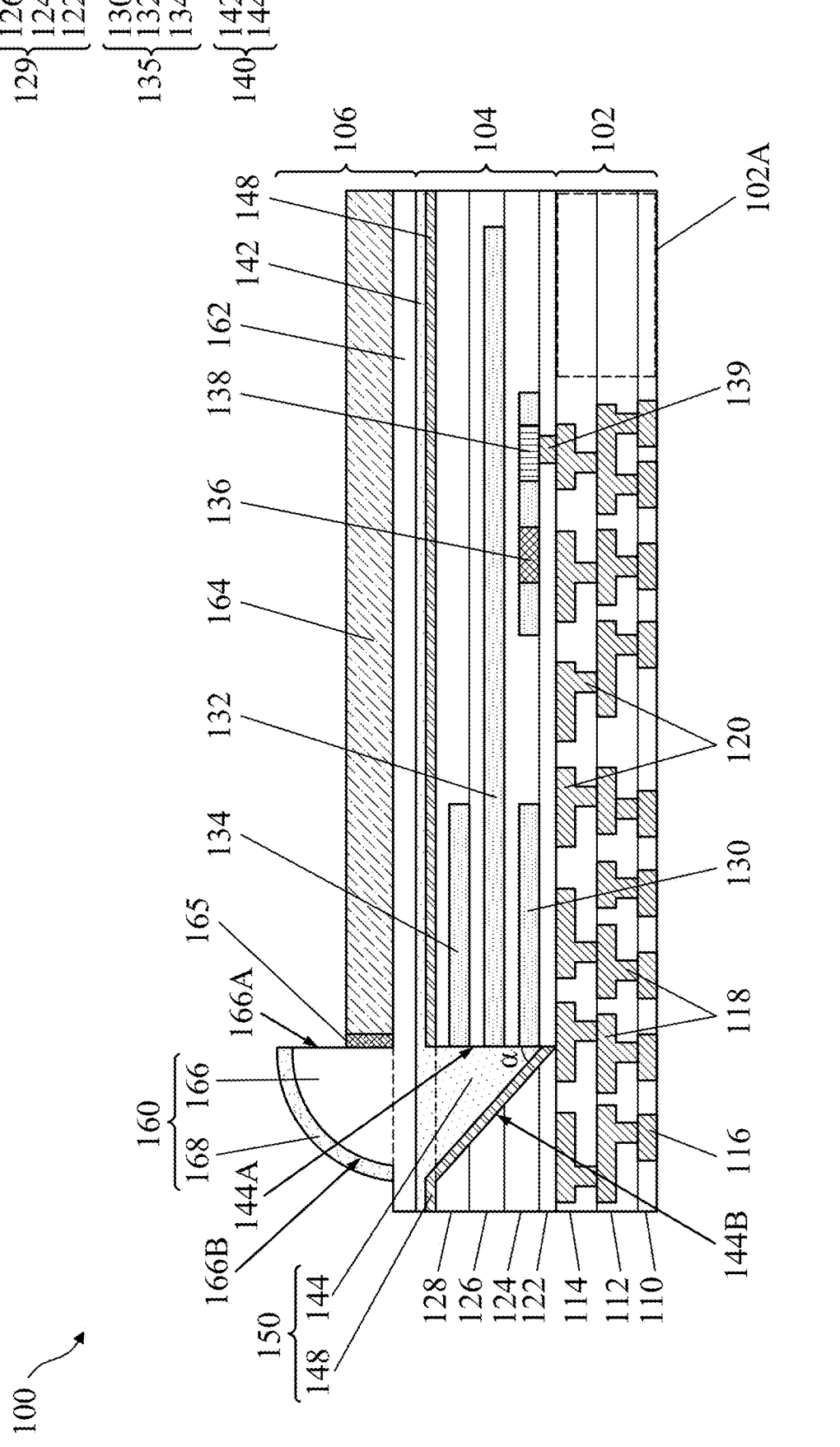

In FIG. 13, the first reflective film 148 is formed over the second sidewall 310B of the trench 310, in accordance with some embodiments. For example, a material of the first reflective film 148 may be formed over the second sidewall 310B of the trench 310 by any suitable deposition processes, such CVD, PVD, a combination thereof, or the like. In some embodiments, one or more layers of the material of the first reflective film 148 may be deposited over the second sidewall 310B of the trench 310 and the top surface of the cladding layer 128. In some embodiments, a patterned mask (e.g., photoresist) may be formed over the material of the first reflective film 148. The patterned mask may cover portions of the material of the first reflective film 148 in the trench 310 while exposing portions of the material of the first reflective film 148 over the top surface of the cladding layer 128. A suitable etching process may then be performed to remove the exposed portion of the material of the first reflective film 148. The material of the first reflective film 148 in the trench 310 remains and forms the first reflective film 148. The patterned mask layer may be removed by a suitable process. In some embodiments, the material of the first reflective film 148 over the top surface of the cladding layer 128 may be partially etched so that the first reflective film 148 may extend over a portion of the top surface of the cladding layer 128, and the resulting structure of the photonic device 100 according to these embodiments of the photonic device 100 is illustrated in FIG. 20C. In some embodiments, the first reflective film 148 over the top surface of the cladding layer 128 may not be etched, and the process of forming the patterned mask and the etching process may be omitted. The resulting structure of the photonic device 100 according to these embodiments of the photonic device 100 is illustrated in FIG. 20D. The extension of the first reflective film 148 over the cladding layer 128 may help block optical noise entering the first reflective structure 150 and the cladding layer 128 In some embodiments, the first reflective film 148 can be omitted when the refractive index of the material of the first transparent layer 140 is sufficiently greater than (e.g., greater than 0.5) the refractive indices of the materials of the cladding layers 122, 124, 126, and 128.

Figure 14:
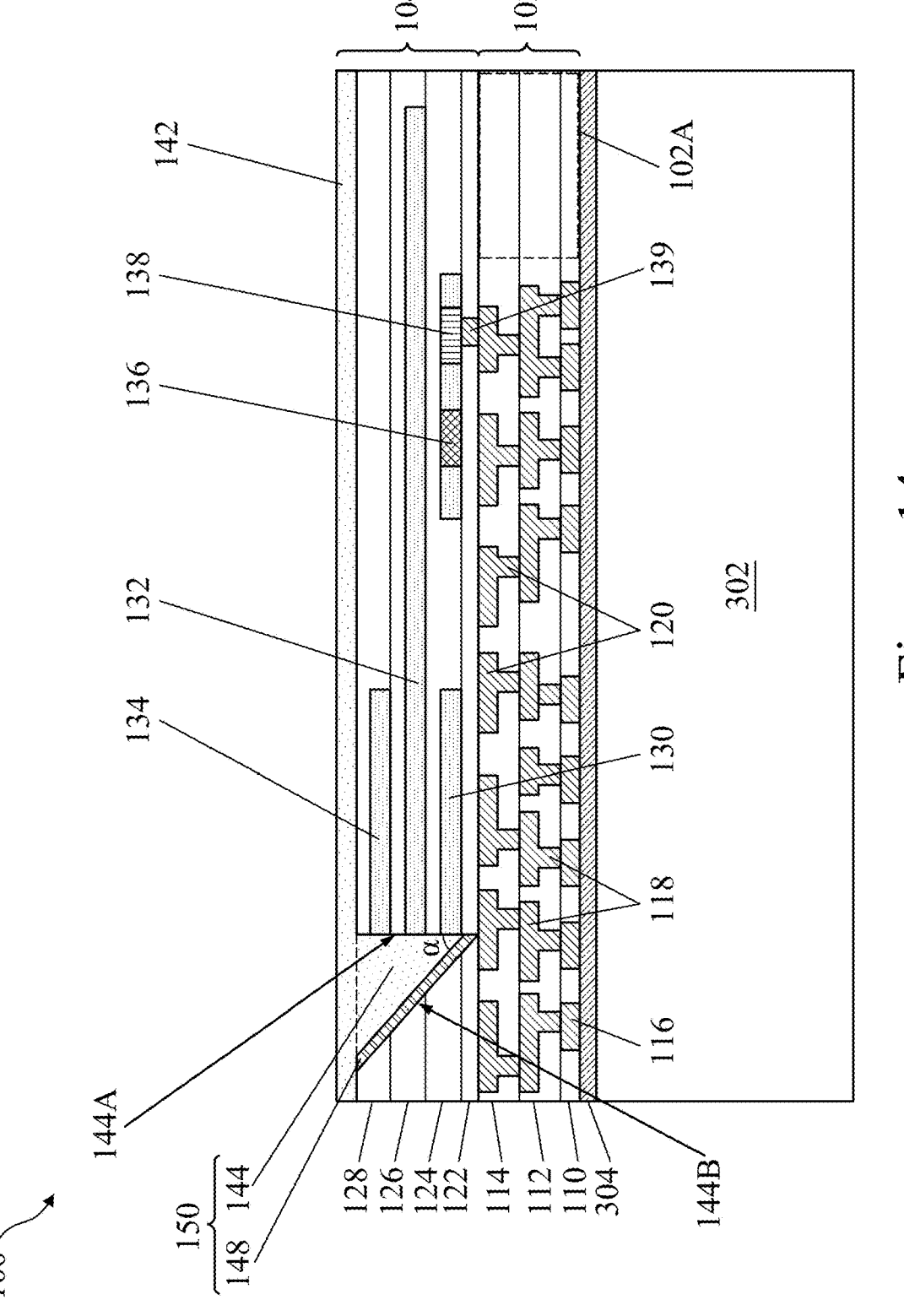
Figure 20E:
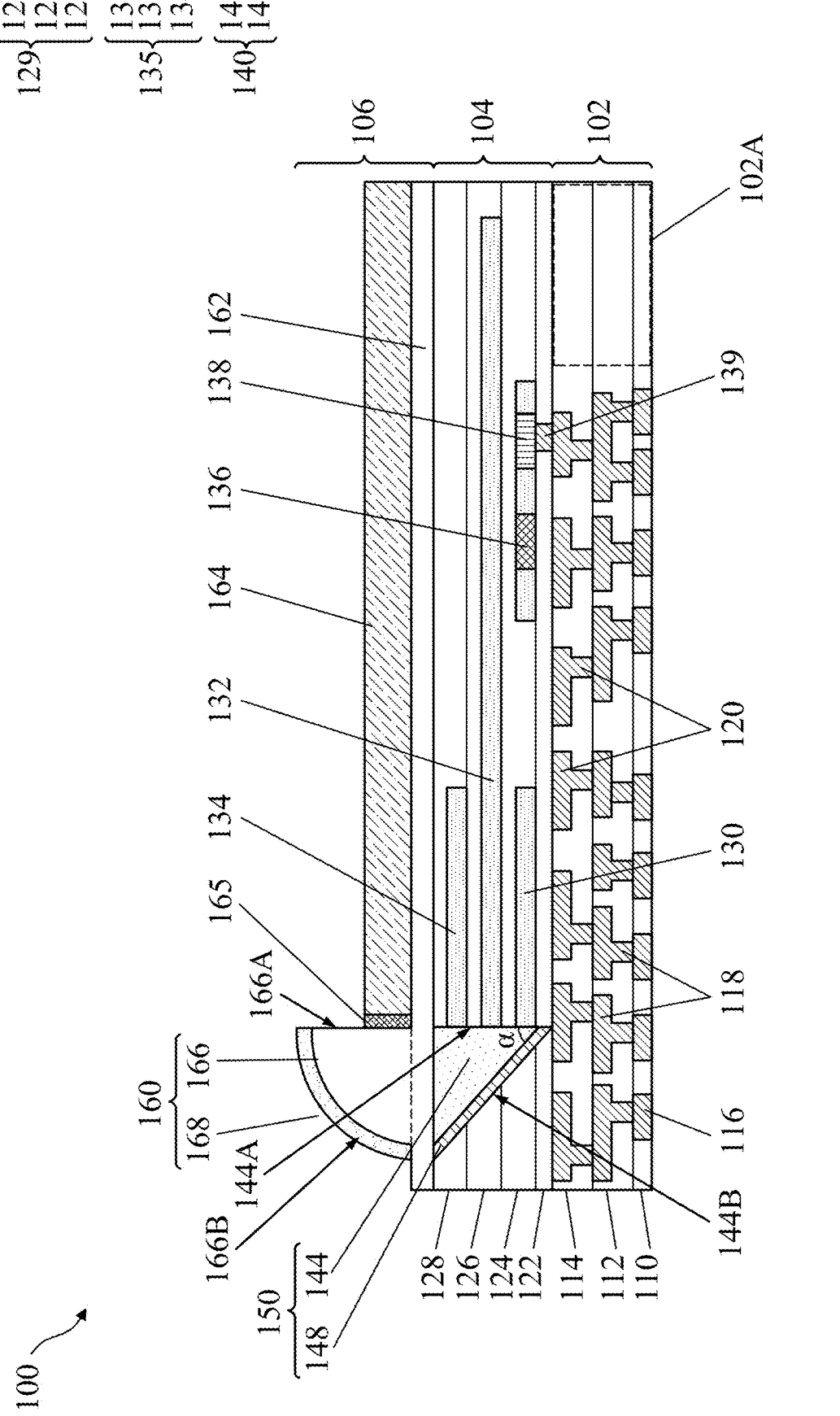

In FIG. 14, the first transparent layer 140 may be formed over the top surface of the cladding layer 128 and fill the trench 310, in accordance with some embodiments. The first transparent layer 140 may be formed by CVD, PVD, spin coating, dip coating, other suitable deposition or coating processes, or a combination thereof. In some embodiments, the upper portion 142 of the first transparent layer 140 is partially removed by the planarization process and has a planarized top surface, within process variations. In some embodiments, the upper portion 142 of the first transparent layer 140 is completely removed, and the cladding layer 128 is exposed, leaving the extension 144 of the first transparent layer 140. The resulting structure of the photonic device 100 according to these embodiments of the photonic device 100 is illustrated in FIG. 20E.

Figure 15:
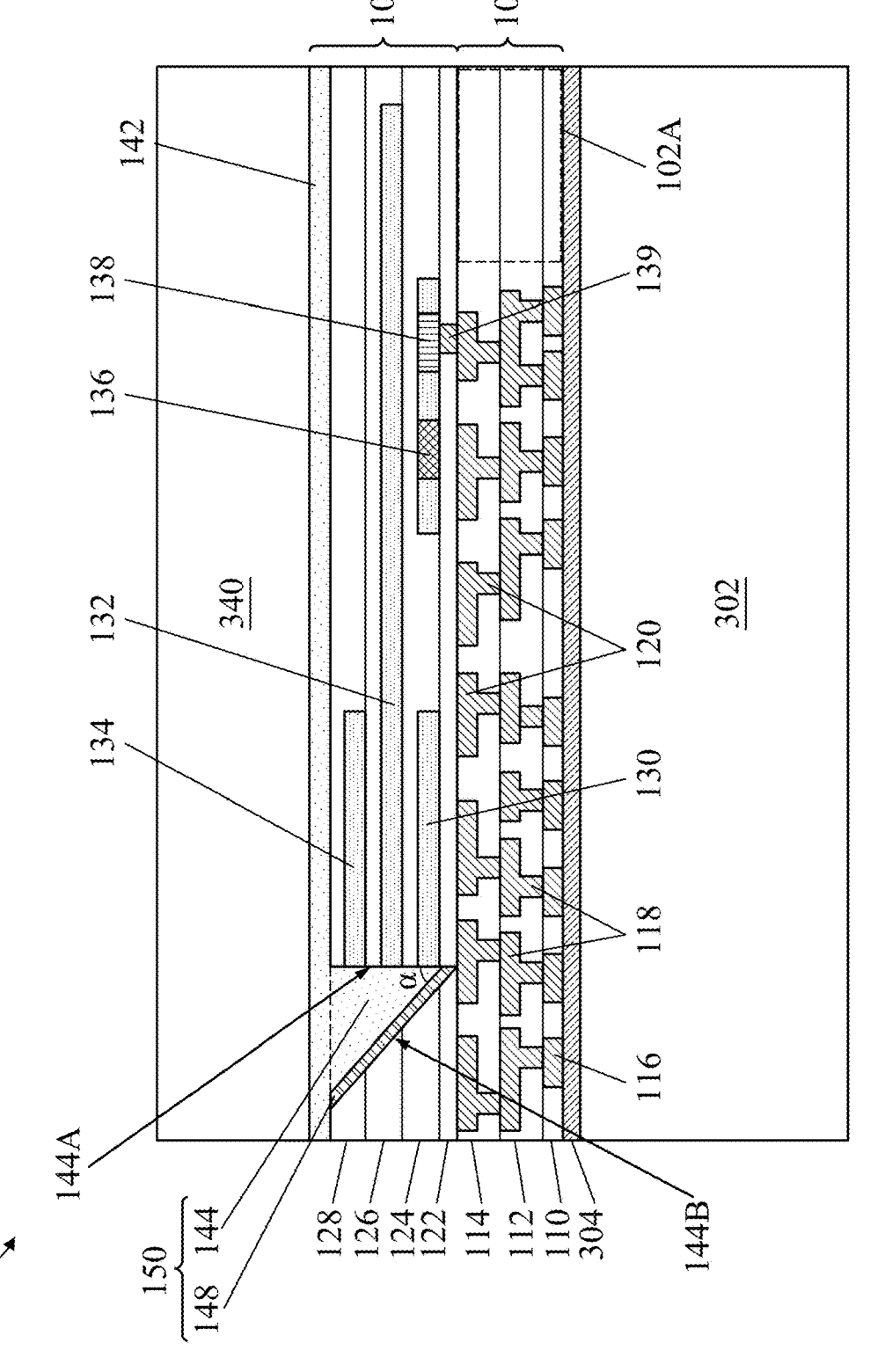
Figure 16:
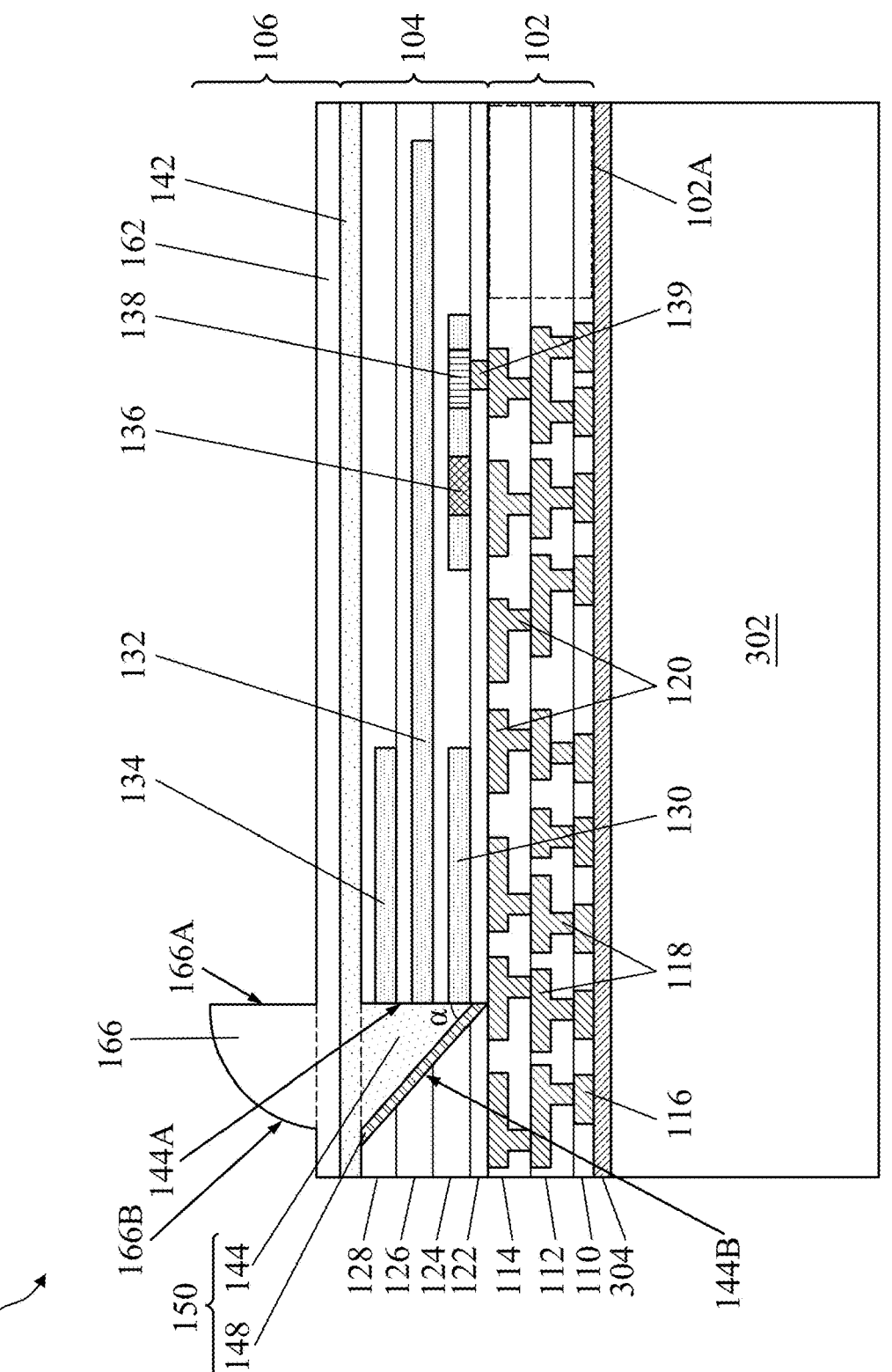

In FIG. 15, a transparent material 340 is formed over the photonic interconnect structure 104 (e.g., over the first transparent layer 140 or the cladding layer 128), in accordance with some embodiments. As will be described in greater detail below, the transparent material 340 will be patterned to form the transparent protrusion 166 and the second transparent layer 162. The transparent material 340 (e.g., the material of the transparent protrusion 166 and the second transparent layer 162) may be formed by CVD. PVD, spin coating, dip coating, other suitable deposition or coating processes, a combination thereof, or the like. In FIG. 16, the transparent material 340 is patterned to form the transparent protrusion 166 and the second transparent layer 162, in accordance with some embodiments. The transparent material 340 may be patterned by suitable lithography and etching processes. For example, the low-light-sensitive photoresist and the multi-tone photomask as described for forming the trench 310 may be used. The low-light-sensitive photoresist may be patterned and have different thicknesses at different positions, such as according to the amount of light exposure using the multi-tone photomask as discussed above with reference to FIGS. 10-12. An etching process may transfer the pattern (e.g., thickness differences) of the low-light-sensitive photoresist to the transparent material 340 to form the transparent protrusion 166 and the second transparent layer 162, in accordance with some embodiments. In some embodiments, the transparent protrusion 166 and the second transparent layer 162 may be separately formed to achieve better process control. For example, the transparent protrusion 166 may be formed using the low-light-sensitive photoresist and the multi-tone photomask, while the second transparent layer 162 may be formed using an ordinary photoresist and a single-tone photomask. In such embodiments, the sequence of forming the transparent protrusion 166 and forming the second transparent layer 162 can be switched. In some embodiments, the groove 170 (see FIG. 2B) is recessed from the top surface of the second transparent layer 162. The groove 170 may be formed using suitable lithography and etching process. For example, a dry etching process, a wet etching process, or a combination thereof may be used.

Figure 17:
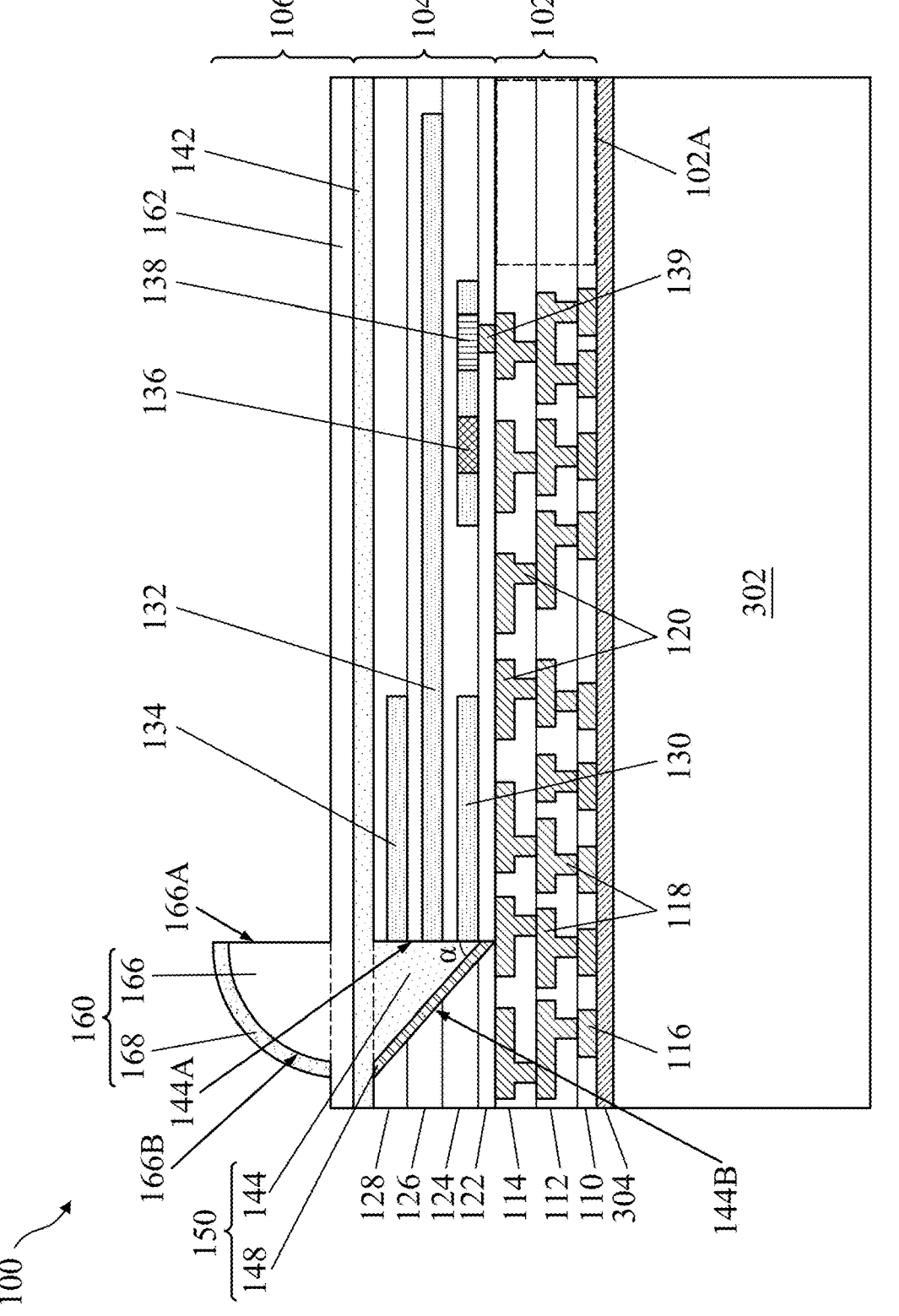

In FIG. 17, the second reflective film 168 is formed over the second sidewall 166B of the transparent protrusion 166, in accordance with some embodiments. In some embodiments, the material of the second reflective film 168 is formed over the transparent protrusion 166 and the second transparent layer 162, and the patterned mask is formed over the material of the second reflective film 168. An etching process may be performed to remove portions of the material of the second reflective film 168 not covered over the patterned mask, leaving the second reflective film 168 disposed over the second sidewall 166B of the transparent protrusion 166. The etching process may be a dry etching or a wet etching. The patterned mask may be removed after the etching process.

Figure 18:
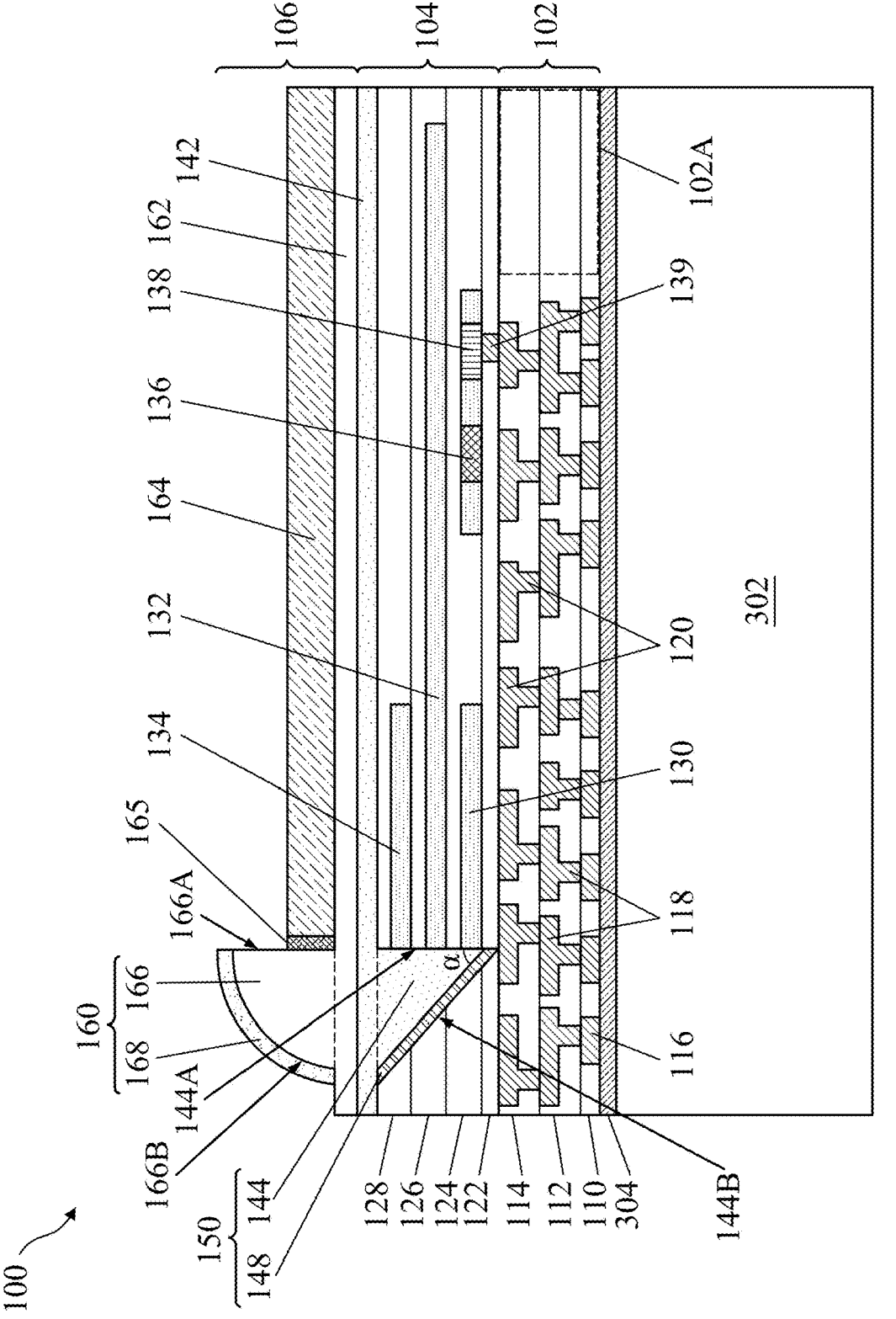

In FIG. 18, the optical fiber 164 is disposed over the second transparent layer 162 and attached to the first sidewall 166A of the transparent protrusion 166, in accordance with some embodiments. For example, the optical fiber 164 may be disposed and fixed in the groove 170 through an adhesive 210 such as the optical glue.

Figure 19:
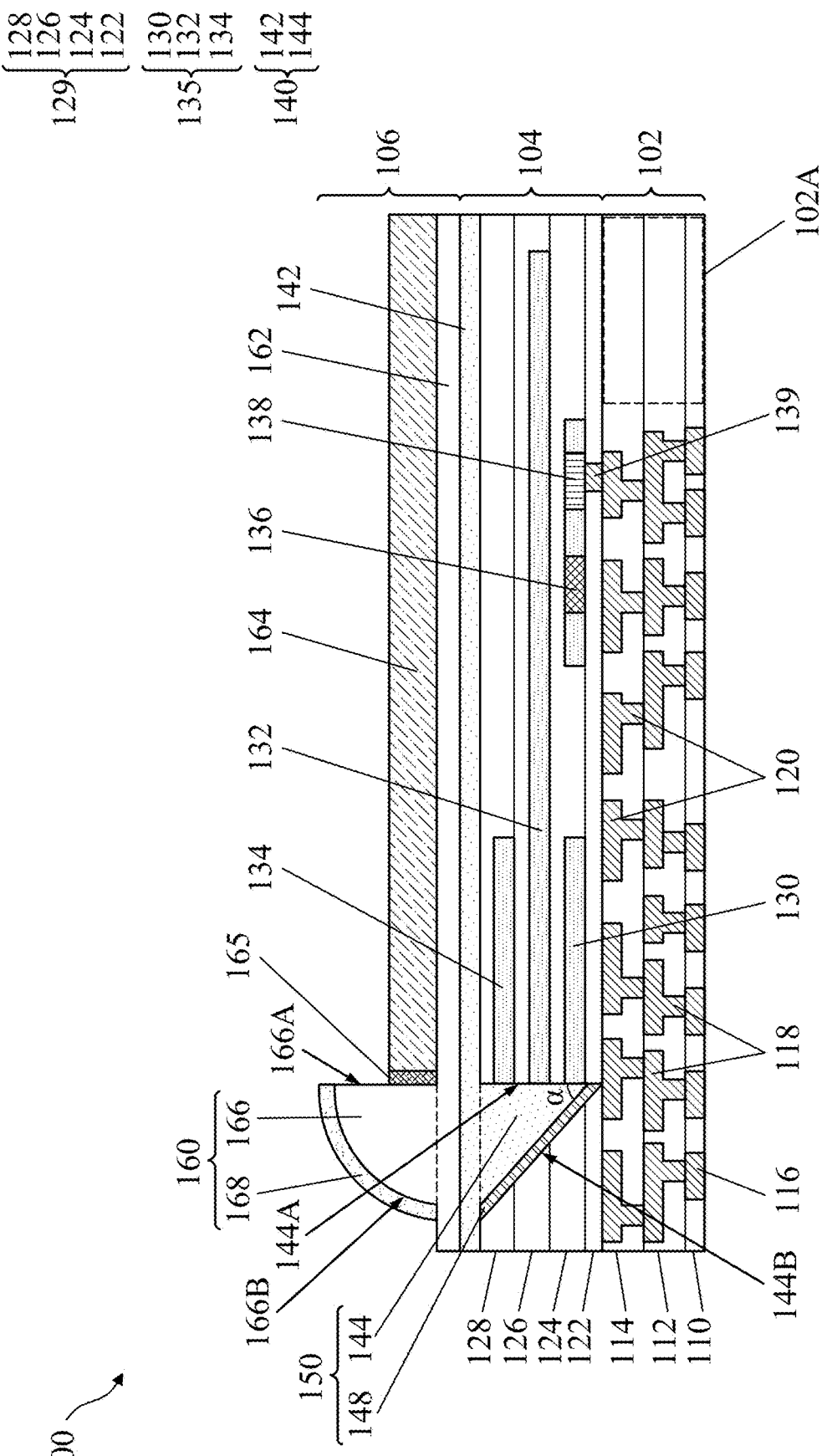

In some embodiments, the substrate 302 is optionally removed, as illustrated in FIG. 19. For example, the substrate 302 may be removed by projecting a light such as a laser light or a UV light on the release layer 304 so that the release layer 304 decomposes under the heat of the light, and the substrate 302 can be removed. In some embodiments, the substrate 302 may be removed by mechanical grinding. In some embodiments, the manufacturing steps of photonic device 100 described above are performed in wafer size. The wafer-size photonic device 100 may be diced to a plurality of individual photonic devices 100. The dicing process may be performed before or after the removal of the substrate 302.

FIG. 21 illustrates a cross-sectional view of a photonic package 500, in accordance with some embodiments. The photonic package 500 may include one or more photonic devices 100 and/or one or more electronic devices 502 disposed on a package substrate 504. The electronic device 502 may not have a photonic component (e.g . . . waveguide, photodetector, or etc.) and may not be able to process or transmit optical signals. In some embodiments, the electronic device 502 may be a logic device such as a central processing unit (CPU), graphics processing unit (GPU), system-on-a-chip (SoC), microcontroller, application-specific integrated circuit (ASIC) or the like; or a memory device, such as a dynamic random-access memory (DRAM) device, static random-access memory (SRAM) device, hybrid memory cube (HMC) module, a high bandwidth memory (HBM) module, or the like; or a stack thereof. In some embodiments, two photonic devices 100 and 100' and one electronic device 502 are illustrated for the photonic package 500, and it is appreciated that any number of the photonic devices 100, 100' and the electronic devices 502 can be implemented. Although FIG. 21 uses a structure of the photonic device 100 as illustrated in FIG. 1 as an example, it is appreciated that the photonic device 100 may have any suitable configurations, such as including a structure as illustrated in FIGS. 20A to 20E or other suitable configurations. The photonic device 100' may be same or similar to the photonic device 100.

In some embodiments, the package substrate 504 is an interposer or a package substrate. In some embodiments, the package substrate 504 includes a substrate 506 and a redistribution structure 508 over the substrate 506. In some embodiments, the substrate 506 is or includes silicon, or includes other suitable substrate materials. In some embodiments, the redistribution structure 508 may include one or more transparent dielectric layers 510. The transparent dielectric layer 510 may include silicon oxide, silicon oxynitride, silicon nitride, or a suitable low-k material having a dielectric constant lower than 3.5. The redistribution structure 508 may also include electrical conductive features 512 and photonic interconnect features. The electrical conductive features 512 may include bonding pads, wiring features, and/or conductive vias, which may be formed by any suitable methods, such as by single or dual damascene processes. The conductive features 116 of the photonic devices 100 and 100' may be attached to the bonding pads of the electrical conductive features 512 through a direct bonding of the conductive features 116 and the bonding pads of the electrical conductive features 512 (e.g., metal-metal bonds without using a eutectic material). In some embodiments, when the direct bonding is formed, the dielectric layer 110 of the photonic devices 100 and 100' may be covalently bonded to the transparent dielectric layer 510, such as via oxide-oxide bonding. In some embodiment, the conductive features 116 of the photonic devices 100 may be attached to the bonding pads of the electrical conductive features 512 through the eutectic material (e.g., solder bumps). In some embodiments, the electronic device 502 is attached to the package substrate 504 in a same manner as the photonic devices 100 and 100', such as through a direct bonding or through the eutectic material.

In some embodiments, the redistribution structure 508 includes a photonic interconnect feature, which may include a waveguide 514. The waveguide 514 may be formed in the dielectric layer (e.g., the uppermost dielectric layer) of the redistribution structure 508. The waveguide 514 may be or include a same material of the waveguides 135 or any suitable material which has a sufficient refractive index difference (e.g., greater than 0.5) with the transparent dielectric layer 510 of the redistribution structure 508. In some embodiments, the waveguide 514 may include a first portion 514A disposed below the photonic device 100 and a second portion 514B disposed below the photonic device 100'. For example, the first portion 514A of the waveguide 514 may horizontally overlap the waveguide 135 and the transparent area 102A of the photonic device 100. The second portion 514B of the waveguide 514 may horizontally overlap the waveguide 135 and the transparent area 102A of the photonic device 100'. In some embodiments the second section 132 of the waveguide 135 of the photonic device 100 and the first portion 514A may both comprise grating couplers so as to transmit optical signals. The second section 132 of the waveguide 135 of the photonic device 100' and the second portion 514B of the waveguide 514 may also both have grating couplers so as to transmit optical signals. As such, the photonic device 100 and the photonic device 100' may communicate with each other through the waveguide 514.

Figure 22:
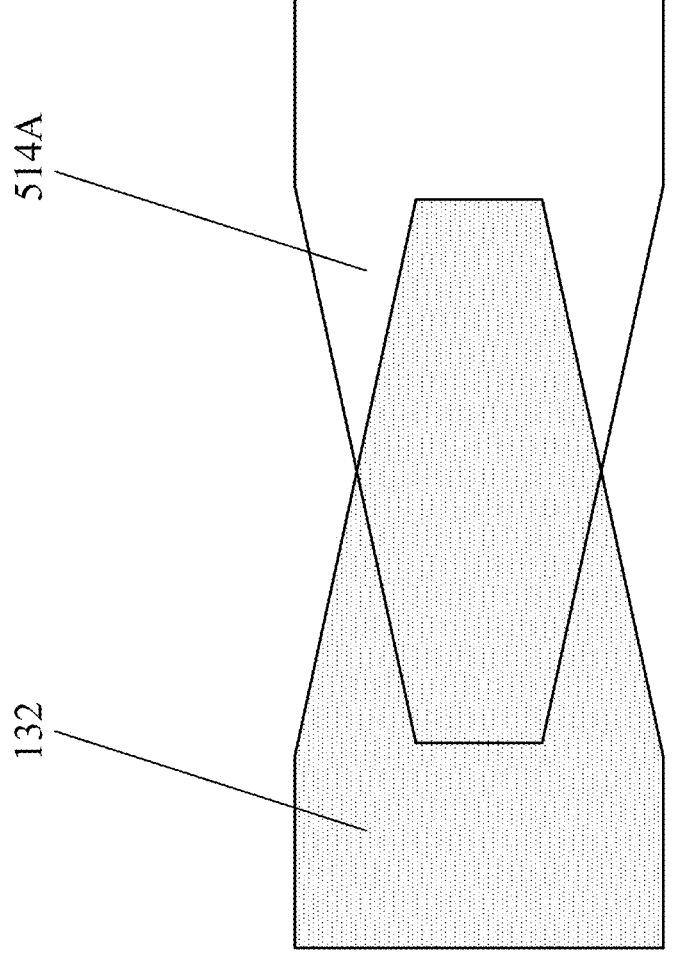
FIG. 22 illustrates a plan view of evanescently coupled waveguides in a photonic device and in a package substrate, in accordance with some embodiments.

In other embodiments in which the electrical interconnect structures 102 are thin enough, the second section 132 of the waveguide 135 of the photonic device 100 and the first portion 514A may both have a tapered end to facilitate being evanescently coupled together. FIG. 22 illustrates a plan view of the evanescently coupled waveguides, such as the second section 132 of the waveguide 135 of the photonic device 100 and the first portion 514A of the waveguide 514 in the package substrate 504, in accordance with some embodiments. The second section 132 of the waveguide 135 of the photonic device 100' and the second portion 514B of the waveguide 514 may also both have a tapered end and be evanescently coupled together. As such, the photonic device 100 and the photonic device 100' may communicate with each other through the waveguide 514.

In some embodiments, in addition to communicating via optical signals, the photonic device 100 and the photonic device 100' may communicate via electrical signals through the electrical conductive features 512 of the redistribution structure 508. The photonic device 100 and/or the photonic device 100' may also communicate with the electronic device 502 via electrical signals through the electrical conductive features 512 of the redistribution structure 508.

The package substrate 504 may optionally include through vias 518 extending through the substrate 506. An insulating layer (not shown) is optionally formed on the back surface of the substrate 506, surrounding the protruding portions of the through vias 518. In some embodiments, the insulating layer is formed of a silicon-containing insulator, such as silicon nitride, silicon oxide, silicon oxynitride, or the like. In another embodiment, the insulating layer is omitted, and the exposed surfaces of the substrate 506 and the through vias 518 are coplanar (within process variations).

Further, conductive connectors 520 are formed on the through vias 518 on the back surface of the substrate 506. The conductive connectors 520 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 520 may be formed of a conductive material that is reflowable, such as solder, copper, aluminum, gold, nickel, silver, palladium, tin, the like, or a combination thereof. Although not shown in FIG. 21, the package substrate 504 may be disposed to another substrate, such as a core substrate, a coreless substrate, a printed circuit board (PCB), a package substrate, or the like, through the conductive connectors 520.

Embodiments may achieve advantages. The embodiments described herein allow for a photonic device to be formed with improved operation and to have a compact size. The vertical integration of the light-receiving structure, the photonic interconnect structure, and the electrical interconnect structure allows the photonic device to receive the light in a horizontal direction, and therefore it is possible to integrate a light source in the photonic device. The vertical integration of the light-receiving structure, photonic interconnect structure, and the electrical interconnect structure also helps the photonic device to have a reduced footprint and a compact size. The photonic device may transmit and process optical signals and electrical signals simultaneously and can be flexibly integrated with other photonic devices or electronic devices in a package.

In accordance with an embodiment, a photonic device includes a photonic interconnect structure that includes a first cladding layer; a waveguide disposed over the first cladding layer; a second cladding layer disposed over the waveguide and the first cladding layer; a transparent material disposed in the first cladding layer and the second cladding layer, wherein the transparent material includes a first sidewall adjacent to the waveguide, wherein the transparent material includes a second sidewall tilted with respect to the first sidewall of the transparent material; and a first reflective film disposed over the second sidewall of the transparent material. In an embodiment, the photonic device also includes a light-receiving structure disposed over the photonic interconnect structure, the light-receiving structure including: a transparent protrusion above the transparent material, the transparent protrusion including a first sidewall and a second sidewall opposite to the second sidewall of the transparent protrusion, wherein the second sidewall of the transparent protrusion is a curved sidewall; and a second reflective film disposed over the second sidewall of the transparent protrusion and horizontally overlapping the first reflective film. In an embodiment, the photonic device further includes an electrical interconnect structure disposed below the photonic interconnect structure. In an embodiment, the electrical interconnect structure includes a transparent dielectric layer and a conductive feature disposed in the transparent dielectric layer, wherein the electrical interconnect structure includes a transparent area free of the conductive feature, wherein the transparent area horizontally overlaps a sidewall of the waveguide. In an embodiment, the transparent material and the first reflective film collectively have a triangular shape, a fan shape, or a trapezoidal shape. In an embodiment, the transparent material is in physical contact with the waveguide. In an embodiment, the first reflective film extends over a top surface of the second cladding layer. In an embodiment, the waveguide includes a tapered end in a plan view. In an embodiment, the light-receiving structure further includes an optical fiber attached to the first sidewall of the transparent protrusion. In an embodiment, the light-receiving structure further includes a transparent layer, wherein the transparent protrusion and the optical fiber are disposed over the transparent layer. In an embodiment, the transparent layer includes a groove recessed from a top surface of the transparent layer, wherein the optical fiber includes at least a portion disposed in the groove. In an embodiment, the groove of the transparent layer includes a V-shape or a U-shape in a cross-sectional view.

In accordance with an embodiment, a photonic package includes a package substrate including a substrate and a redistribution structure disposed over the substrate, wherein the redistribution structure includes a dielectric layer, a first waveguide disposed in the dielectric layer, and an electrical conductive feature; a first photonic device attached to the package substrate, the first photonic device including an electrical interconnect structure and a photonic interconnect structure, wherein the electrical interconnect structure is between the photonic interconnect structure and the package substrate, wherein the photonic interconnect structure includes a second waveguide disposed between a first cladding layer and a second cladding layer, wherein the photonic interconnect structure horizontally overlaps a first portion of the first waveguide; and a second photonic device attached to the package substrate, the second photonic device horizontally overlapping a second portion of the first waveguide. In an embodiment, the electrical interconnect structure includes a transparent area that is free of conductive features, wherein the transparent area of the electrical interconnect structure horizontally overlaps the first waveguide and the second waveguide. In an embodiment, the electrical interconnect structure of the first photonic device includes a first conductive pad bonded to the electrical conductive feature of the redistribution structure of the package substrate. In an embodiment, the first photonic device is electrically coupled to the second photonic device through the electrical conductive feature of the redistribution structure.

In accordance with an embodiment, a method including forming a waveguide over a first cladding layer; forming a second cladding layer over the waveguide and the first cladding layer; forming a trench in the first cladding layer and the second cladding layer, wherein the trench includes a first sidewall and a second sidewall, wherein the first sidewall of the trench is adjacent to the waveguide, wherein the second sidewall of the trench is tilted with respect to the first sidewall of the trench; forming a first reflective film over the second sidewall of the trench; forming a first transparent layer over the second cladding layer and filling the trench; disposing a transparent protrusion over the first transparent layer, wherein the transparent protrusion includes a first sidewall and a second sidewall opposite to the first sidewall; and forming a second reflective film over the second sidewall of the transparent protrusion. In an embodiment, the method further includes attaching an optical fiber to the first sidewall of the transparent protrusion, wherein an optical path between the optical fiber and the waveguide is reflected off the second reflective film and the first reflective film. In an embodiment, the second reflective film horizontally overlaps the first reflective film. In an embodiment, disposing the transparent protrusion includes forming a transparent material over the second cladding layer and the first transparent layer; and patterning the transparent material to from a second transparent layer and the transparent protrusion. In an embodiment, the method further includes forming a groove in a top surface of the second transparent layer; and disposing an optical fiber in the groove.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic device, comprising:
a photonic interconnect structure comprising:
a first cladding layer;
a waveguide disposed over the first cladding layer;
a second cladding layer disposed over the waveguide and the first cladding layer;
a transparent material disposed in the first cladding layer and the second cladding layer, wherein the transparent material comprises a first sidewall directly facing the waveguide, wherein the transparent material comprises a second sidewall tilted with respect to the first sidewall of the transparent material; and
a first reflective film disposed over the second sidewall of the transparent material; and a light-receiving structure disposed over the photonic interconnect structure, the light-receiving structure comprising:
a transparent protrusion above the transparent material, the transparent protrusion comprising a first sidewall and a second sidewall opposite to the first sidewall of the transparent protrusion, wherein the second sidewall of the transparent protrusion is a curved sidewall; and
a second reflective film disposed over the second sidewall of the transparent protrusion and horizontally overlapping the first reflective film.

2. The photonic device of claim 1, further comprising an electrical interconnect structure disposed below the photonic interconnect structure.

3. The photonic device of claim 2, wherein the electrical interconnect structure comprises a transparent dielectric layer and a conductive feature disposed in the transparent dielectric layer, wherein the electrical interconnect structure comprises a transparent area free of the conductive feature, wherein the transparent area horizontally overlaps a sidewall of the waveguide.

4. The photonic device of claim 1, wherein the transparent material and the first reflective film collectively have a triangular shape, a fan shape, or a trapezoidal shape.

5. The photonic device of claim 1, wherein the transparent material is in physical contact with the waveguide.

6. The photonic device of claim 1, wherein the first reflective film extends over a top surface of the second cladding layer.

7. The photonic device of claim 1, wherein the waveguide comprises a tapered end in a plan view.

8. The photonic device of claim 1, wherein the light-receiving structure further comprises an optical fiber attached to the first sidewall of the transparent protrusion.

9. The photonic device of claim 8, wherein the light-receiving structure further comprises a transparent layer, wherein the transparent protrusion and the optical fiber are disposed over the transparent layer.

10. The photonic device of claim 9, wherein the transparent layer comprises a groove recessed from a top surface of the transparent layer, wherein the optical fiber comprises at least a portion disposed in the groove.

11. The photonic device of claim 10, wherein the groove of the transparent layer comprises a V-shape or a U-shape in a cross-sectional view.

12. A photonic device, comprising:
a photonic interconnect structure comprising:
a first cladding layer;
a waveguide disposed over the first cladding layer;
a second cladding layer disposed over the waveguide and the first cladding layer;
a transparent material disposed in the first cladding layer and the second cladding layer, wherein the transparent material comprises a first sidewall directly facing and in physical contact with the waveguide, wherein the transparent material comprises a second sidewall tilted with respect to the first sidewall of the transparent material; and
a first reflective film disposed over the second sidewall of the transparent material; and
an electrical interconnect structure disposed below the photonic interconnect structure;
a light-receiving structure disposed over the photonic interconnect structure, the light-receiving structure comprising:

a transparent protrusion above the transparent material, the transparent protrusion comprising a first sidewall and a second sidewall opposite to the first sidewall of the transparent protrusion, wherein the second sidewall of the transparent protrusion is a curved sidewall; and a second reflective film disposed over the second sidewall of the transparent protrusion and horizontally overlapping the first reflective film.

13. The photonic device of claim 12, wherein the transparent material and the first reflective film collectively have a triangular shape.

14. The photonic device of claim 12, wherein the transparent material and the first reflective film collectively have a fan shape.

15. The photonic device of claim 12, wherein the transparent material and the first reflective film collectively have a trapezoidal shape.

16. A photonic device, comprising:

a photonic interconnect structure comprising:

a first cladding layer;

a waveguide disposed over the first cladding layer, wherein the waveguide comprises a tapered end in a plan view;

a second cladding layer disposed over the waveguide and the first cladding layer;

a transparent material disposed in the first cladding layer and the second cladding layer, wherein the transparent material comprises a first sidewall directly facing the waveguide, wherein the transparent material comprises a second sidewall tilted with respect to the first sidewall of the transparent material; and a first reflective film disposed over the second sidewall of the transparent material, wherein the first reflective film extends over a top surface of the second cladding layer; and a light-receiving structure disposed over the photonic interconnect structure, the light-receiving structure comprising:

a transparent protrusion above the transparent material, the transparent protrusion comprising a first sidewall and a second sidewall opposite to the first sidewall of the transparent protrusion, wherein the second sidewall of the transparent protrusion is a curved sidewall; and a second reflective film disposed over the second sidewall of the transparent protrusion and horizontally overlapping the first reflective film.

17. The photonic device of claim 16, wherein the light-receiving structure further comprises an optical fiber attached to the first sidewall of the transparent protrusion.

18. The photonic device of claim 16, wherein the light-receiving structure further comprises a transparent layer, wherein the transparent protrusion and the optical fiber are disposed over the transparent layer.

19. The photonic device of claim 18, wherein the transparent layer comprises a groove recessed from a top surface of the transparent layer, wherein the optical fiber comprises at least a portion disposed in the groove.

20. The photonic device of claim 19, wherein the groove of the transparent layer comprises a V-shape in a cross-sectional view.

* * * * *